(12) United States Patent
Llandro et al.

(10) Patent No.: US 8,283,916 B2
(45) Date of Patent: Oct. 9, 2012

(54) MAGNETIC TAGGING TECHNIQUES

(76) Inventors: Justin Llandro, New Malden (GB);
James Anthony Charles Bland, Cambridge (GB); James Albert Bland, legal representative, Cambridge (GB); Kathleen Jillian Bland, legal representative, Cambridge (GB); Nikolay Ivanonich Zheludev, Highfield (GB); Frieda Van Belle, Amsterdam (NL); Klaus Peter Kopper, Helmenzen (DE); Stephan Steinmüller, Munich (DE); Theodossis Trypiniotis, Limassol (CY); Athanasios Mitrelias, Athens (GR)

( * ) Notice: Subject to any disclaimer, the term of this patent is extended or adjusted under 35 U.S.C. 154(b) by 727 days.

(21) Appl. No.: 12/094,349

(22) PCT Filed: Nov. 21, 2006

(86) PCT No.: PCT/GB2006/050406
§ 371 (c)(1), (2), (4) Date: Dec. 30, 2008

(87) PCT Pub. No.: WO2007/057718
PCT Pub. Date: May 24, 2007

(65) Prior Publication Data
US 2009/0212768 A1    Aug. 27, 2009

(30) Foreign Application Priority Data
Nov. 21, 2005    (GB) .................................. 0523631.0

(51) Int. Cl.
*G01B 7/30* (2006.01)
(52) U.S. Cl. .............. 324/207.25; 340/572.8; 340/572.1
(58) Field of Classification Search ............. 324/207.25, 324/228, 244, 260; 340/10.51, 10.52, 572.1, 340/572.6, 547, 551, 552, 572.8
See application file for complete search history.

(56) References Cited

U.S. PATENT DOCUMENTS

| | | | | |
|---|---|---|---|---|
| 5,926,095 A | * | 7/1999 | Ho et al. .................... | 340/572.6 |
| 6,120,735 A | * | 9/2000 | Zborowski et al. ............. | 422/73 |
| 2003/0027197 A1 | * | 2/2003 | Nikitin et al. ..................... | 435/6 |
| 2005/0017082 A1 | * | 1/2005 | Moran et al. .................. | 235/493 |
| 2005/0244955 A1 | * | 11/2005 | Li et al. ....................... | 435/287.2 |
| 2007/0114786 A1 | * | 5/2007 | Antonenco et al. ............. | 283/70 |

FOREIGN PATENT DOCUMENTS

| | | |
|---|---|---|
| EP | 0 745 682 A1 | 12/1996 |
| WO | WO 01/08085 A | 2/2001 |
| WO | WO 01/85325 A | 11/2001 |
| WO | WO 03/081261 A | 10/2003 |

OTHER PUBLICATIONS

International Search Report for corresponding PCT/GB2006/050406, completed Apr. 24, 2007 by Yves Gelebart of the EPO.

* cited by examiner

*Primary Examiner* — Roberto Velez
*Assistant Examiner* — Temilade S Rhodes-Vivour

(57) ABSTRACT

This invention relates to microfluidic apparatus for reading, writing and sorting magnetic tags attached to chemical and biological molecules and other entities. We describe apparatus for separating chemical or biological molecules or moieties each individually attached to a MBM tag miniature multi-bit magnetic tag capable of adopting a plurality of remanent magnetic configurations corresponding to binary information, the apparatus comprising: at least one input for said tagged molecules or moieties; at least two outputs for said tagged molecules or moieties; a microfluidic flow channel incorporating: magnetic readers to read said binary information; magnetic writers to write said binary information; and a switch to direct said tagged molecules or moieties to a selected said output responsive to said binary information. The invention also relates to planar multibit magnetic tags suitable for use with such apparatus.

22 Claims, 23 Drawing Sheets

MAGNETIC TAGGING TECHNIQUES

This invention relates to apparatus for remotely reading and remotely encoding multibit magnetic tags for the identification of, labeling and sorting of chemical and biological molecules and other entities.

Labels or multibit tags are widely used for labelling objects, usually of macroscopic size. Magnetic labels offer the advantage over optical labels that encoding of the information stored in the label can be easily carried out by applying an external magnetic field whereas most optical tags are 'read only'. There are many known types of multibit magnetic storage devices. For example a magnetic strip on a credit card stores information at low density and a hard disk drive stores information at high density, both in a continuous layer of magnetic material. In this type of system a local read/write head is used to locally read and write individual data bits. However this arrangement is unsatisfactory for a magnetic label or tag particularly a small tag suitable for use for information tagging very small chemical or biological entities since it is difficult to control the position of the tag with respect to the sensor with sufficient precision for such small entities to be resolved. International Patent Application WO 01/08085 describes a multi-bit luggage tag but again this tag is not suitable for tagging microscopic entities. Other background prior art is described in US2004/0233057 and U.S. Pat. No. 5,729,201.

There is a need for a design of a tag which is appropriate for sensing on a small scale and this becomes challenging as the scale is reduced. Such difficulties are solved in the case of a conventional hard disc by using a highly controlled mechanism to fly the sensor over the smooth surface of a magnetic hard disc, which contains magnetic bits encoded in tracks with the overall structure of disk optimised for sensing by the magnetoresistive read head. For this reason only single magnetic or paramagnetic beads have been used as tags for such small biological or chemical entities and such tags cannot adopt multibit states. It is therefore desirable to be able to determine the magnetic information in a miniature multibit tag, without the need for local reading, by sensing the total field or response produced by the tag.

According to the present invention there is therefore provided a miniature magnetic tag for tagging a chemical or biological molecule or moiety or a biological entity, the tag being configured to store a plurality of bits of binary information, the tag comprising: a plurality of physically separate regions of switchable magnetic material; and wherein said switchable magnetic material regions are bistably switchable between at least two different magnetised states by means of an external applied field.

According to another aspect of the present invention there is provided a magnetic tag of 50 microns size or smaller attached to a biological or chemical moiety for storing a plurality of bits of binary information, the tag comprising: a plurality of physically separate regions of switchable magnetic material each with a distinct coercive or switching field.

Preferably in embodiments of the above aspects of the invention the separate regions of magnetic material are switchable at different external applied field strengths, for example at least 10 percent different from one another to facilitate global writing and reading of data onto and from the tag by controlling a magnetic field applied to the tag as a whole. Broadly speaking the external applied field is changed and the presence or absence of magnetic switching transitions of the switchable regions is detected—the absence of a switching transition implies that the applied field is in the same direction as the relevant magnetised region. Since to read the tag the field is increased from a minimum below the switching field of the lowest switching region to be read to above the switching field of the highest switching region to be read the read-out process is destructive and optionally, therefore, the stored data is refreshed after reading. The writing process begins by writing the region (of those to be written) having the highest switching field, then reducing the switching field to write regions of successively lower switching field strength (these lower applied fields leaving the regions of higher switching field substantially unaffected). In addition, it is desirable to have control data regions, to define the orientation of the tag for example.

Preferably the tag is provided with a tether such as a molecular tether for tethering a tag to a chemical or biological molecule or moiety or to a chemical or biological entity.

In some preferred embodiments the tag is shaped so as to be suitable for hydrodynamic flow. The tag may have the overall form of a cylinder, tube or ellipsoid for example. Preferably the tag is smaller than 50 microns maximum dimension and the separately switchable regions or elements of the tag are designed to have different coercive or switching fields by changing thickness or composition of each region or element for example.

In another aspect this invention provides a multi-bit magnetically encoded miniature tag tethered to a chemical or biological entity, preferably having a shape suitable for reading by a remote sensor, preferably by detecting the stray dipole field from the plurality of bits. Thus in embodiments the shape of the tag is matched to the dimensions and shape of the sensors or that the surface is smooth enough to allow a magneto-optical signal to be obtained.

In another aspect this invention provides a multi-bit magnetically encoded miniature tag tethered to a chemical or biological entity, preferably having a shape suitable for reading by a remote sensor, by detecting the magneto-optical signal. Thus in embodiments the tag is surface is smooth enough to allow a magneto-optical signal to be obtained.

In another aspect this invention provides a multi-bit magnetically encoded miniature tag tethered to a chemical or biological entity, preferably having a shape suitable for hydrodynamic flow, preferably a plurality of bits separately readable and/or writable by means of a non-proximity technique, in particular by applying a magnetic field to the tag as a whole.

Thus the invention further provides apparatus as recited in claim 1.

In a related aspect the invention provides apparatus for separating objects tagged with a tag more particularly a miniature tag, for example as described above, the apparatus comprising: at least one input for said tagged objects; at least two outputs for said tagged objects; preferably a microfluidic flow channel incorporating: magnetic readers to read said binary information; magnetic writers to write said binary information; and a switch to direct said tagged molecules or moieties or entities to a selected said output responsive to said binary information. The flow of the tagged moieties within the channel is controlled using conventional microfluidic principles (i.e. controlling pressure, density of tags, etc.) and the orientation and position of the tags in controlled using strip lines/electrodes via electric or magnetic fields.

Preferred embodiments of the apparatus also include a writer to write read information to a tag to refresh the information. Preferred embodiments of a reader and writer are described below.

Preferably the apparatus includes a reservoir for the tagged objects coupled to the input and one or more channels between the input and the outputs so that these are in fluid communication. Any convenient pumping mechanism may be employed by the apparatus. If there is a single channel between the input and the outputs then preferably the fluid flow is controlled to facilitate sharing of the channel.

In embodiments the switch comprises an electromagnet to deflect a tagged object, but other means to apply magnetic deflection for an electromagnetic force may also be employed. For example in some preferred embodiments the switch employs dielectrophoresis. In some embodiments the tagged object is directed to one of two alternative outputs, but in other embodiments more outputs may be provided.

The apparatus, more particularly the input, switch and outputs may be macro- or microscopic and, in embodiments, may be implemented on a microfluidic chip. The tagged objects in some preferred embodiments comprise microscopic chemical or biological entities.

In embodiments a fluid channel between the input and the outputs includes a constriction and the reader is located adjacent to this constriction. Preferably the constriction is arranged so that the tags pass the reader on average one at a time. The dimensions of the constriction depend upon the tag dimensions but, in embodiments, the constriction has a maximum lateral dimension of approximately 200 microns.

The above described apparatus may be used as a sorting device to sort the tagged objects. A plurality of instances of the apparatus may be chained, for example each to sort on a different binary bit of data stored on a tag and/or according to a parameter defined by a plurality of the stored bits. Where the apparatus is chained a writer is included to re-write the read data ready for the next apparatus. Where a Y-junction channel connects the input with the outputs the writer is preferably located for the channel splits. In embodiments an output may be fed back to the input of the apparatus for multiple pass sorting for greater discrimination. In still further embodiments a plurality of instances of the apparatus may be provided in parallel, for example on a microfluidic chip.

In another aspect the invention provides a method of writing information onto a magnetic tag, the tag having a plurality of magnetically switchable regions for storing said information, said regions being separately switchable at different strengths of an external applied field, the method comprising: controlling said external applied field to set each said region in turn into a bistable magnetic state, in order of decreasing external applied field strength.

The invention further provides a method of writing information onto a magnetic tag, the tag having a plurality of magnetically switchable regions for storing said information, said regions being separately switchable at different strengths of an external applied field, the method comprising: applying a set of external applied fields to said tag, each field of said set of applied fields comprising a field of sufficient strength to switch ones of said regions having switching strengths equal to or less than the field strength, said applying comprising applying said fields in turn from a strongest field to a weakest field, whereby after each said field application one or more of said regions is switched to a magnetic state which is substantially unaffected by subsequently applied fields of the set.

In a related aspect the invention provides apparatus for writing information onto a magnetic tag, the tag having a plurality of magnetically switchable regions for storing said information, said regions being separately switchable at different strengths of an external applied field, the apparatus comprising means for controlling said external applied field to set each said region in turn into a said bistable magnetic state, in order of decreasing external applied field strength.

In a further related aspect the invention provides apparatus for writing information onto a magnetic tag, the tag having a plurality of magnetically switchable regions for storing said information, said regions being separately switchable at different strengths of an external applied field, the apparatus comprising means for applying a set of external applied fields to said tag, each field of said set of applied fields comprising a field of sufficient strength to switch ones of said regions having switching strengths equal to or less than the field strength, said applying comprising applying said fields in turn from a strongest field to a weakest field, whereby after each said field application one or more of said regions is switched to a magnetic state which is substantially unaffected by subsequently applied fields of the set.

The invention further provides a method of reading information from a magnetic tag, the tag having a plurality of magnetically switchable regions storing said information, said regions being separately switchable at different strengths of an external applied field, the method comprising: applying an external applied field to said plurality of switchable regions simultaneously in increasing strength from a strength below a smallest switching strength of a said region to above a greatest switching strength of a said region; and monitoring switching of said regions as said field is increased by monitoring a total magnetic moment of said tag.

Preferably the applied field is ramped with increasing the field so that the switching threshold field strength of a region is traversed.

As previously mentioned, information may be read from a tag using a local reading head in proximity to a selected region. However this has drawbacks, as already mentioned.

According to a further aspect the invention therefore provides a method of reading information from a magnetic tag, the tag having a plurality of magnetically switchable regions storing said information, said regions being separately switchable at different strengths of an external applied field, the method comprising magneto-optical detection of the tag moment. In embodiments the method comprises magneto-optical imaging to form an image of the magnetization of the regions.

The invention still further provides apparatus for reading information from a magnetic tag, the tag having a plurality of magnetically switchable regions storing said information, said regions being separately switchable at different strengths of an external applied field, the apparatus comprising: means for applying an external applied field to said plurality of switchable regions simultaneously in increasing strength from a strength below a smallest switching strength of a said region to above a greatest switching strength of a said region; and means for monitoring switching of said regions as said field is increased by monitoring a total magnetic moment of said tag.

In some particularly advantageous applications the tag is attached to a microscopic chemical or biological entity (molecule, compound, protein, cell, virus, antibody, antigen and the like). Since multibit tags are in principle capable of carrying billions of codes and can readily be produced in very large numbers they can be used for labelling a library of chemical or biological entities. These and other aspects of the invention will now be further described, by way of example only, with reference to the accompanying figures in which:

FIG. 3 shows examples of a multi-bit magnetic tag with;

Non-Proximity Reading

Broadly we will describe a method of non-proximity reading of a multi-bit magnetic object which may be used as a magnetic tag. Embodiments provide: a multi-domain magnetic tag capable of reliably being induced to adopt any one of a number of unique and distinguishable magnetic states; a highly sensitive magnetic sensor capable of discriminating between potentially very similar magnetic moments with high specificity; a method of generating a localized magnetic field to high accuracy; a method of maintaining magnetic elements and any associated biological molecules in suspension (aqueous or otherwise) to convey them to the above items at maximum throughput; and a method of manipulating magnetic elements in suspension both to and from the magnetic sensor and the magnetic field generator.

The system makes an indirect measurement of the magnetic state of a magnetic element or individual component of an assembly of magnetic elements by a global differential measurement of the total magnetic moment of the assembly, using measurements taken both before and after the application of a tailored magnetic field. A sequence of these measurements, optionally using a ladder of magnetic fields, may be applied to successively infer the magnetic states of each of the individual elements in an assembly of magnetic particles, and thus provide a complete determination of the magnetic state of the entire assembly. This technique may, for example, be applied to each of the individual magnetic bits in a multibit magnetic tag in succession, and thus completely determine the tag's magnetically encoded sequence. One motivation for performing a differential measurement instead of just measuring the value of the magnetic moment is to overcome the problem of degeneracy of tag codes that have a different combination of magnetic domains, but add up to the same total magnetic moment.

Figure 1:
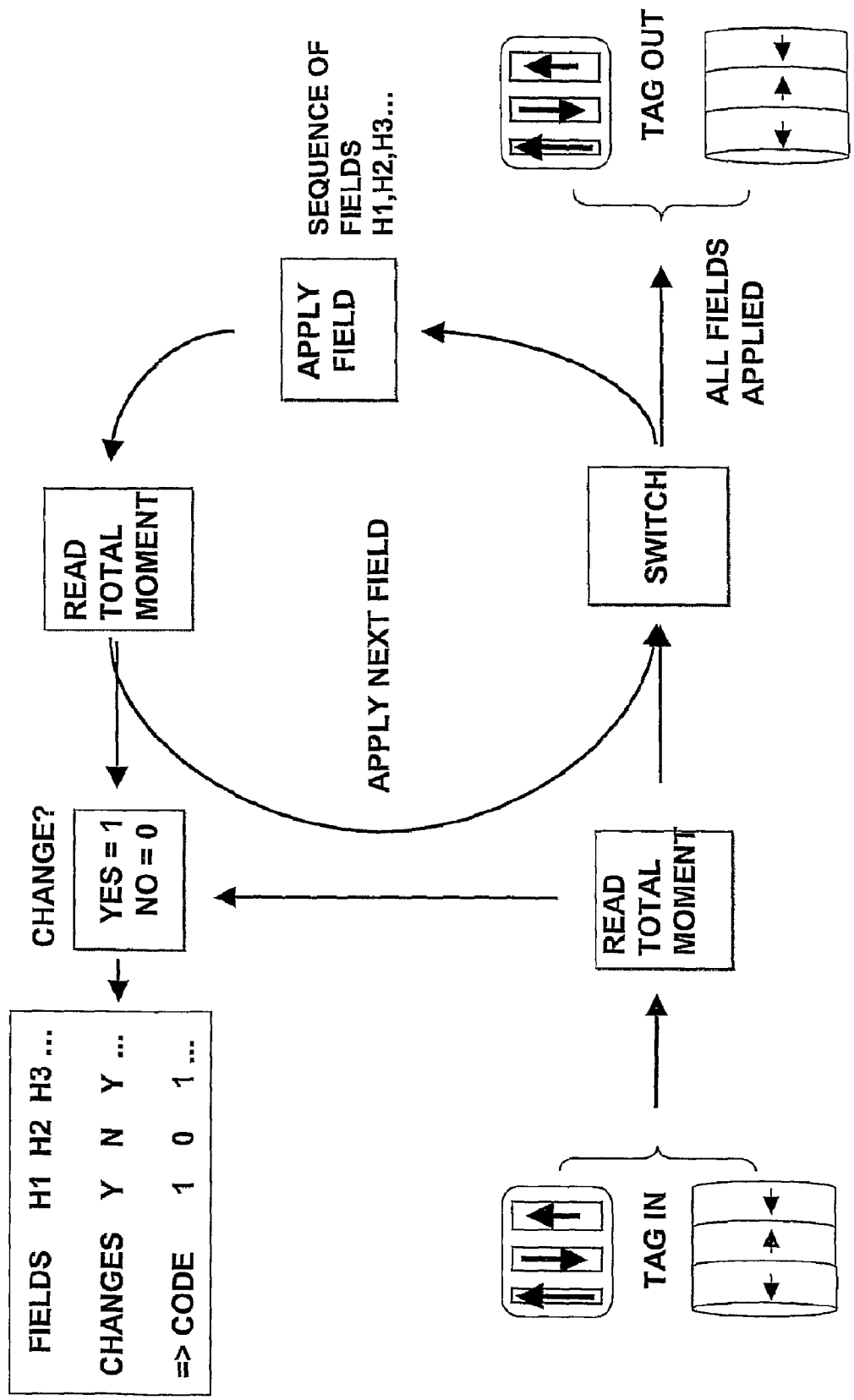
FIG. 1 shows a procedure for reading multi-coercivity tags.
Figure 2:
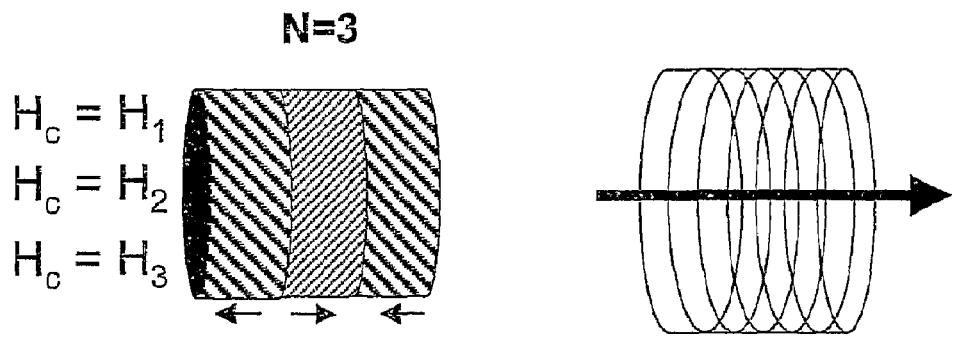
FIG. 2 shows a schematic diagram of a data encoding principle employed by a multi-coercivity tag.
Figure 2:
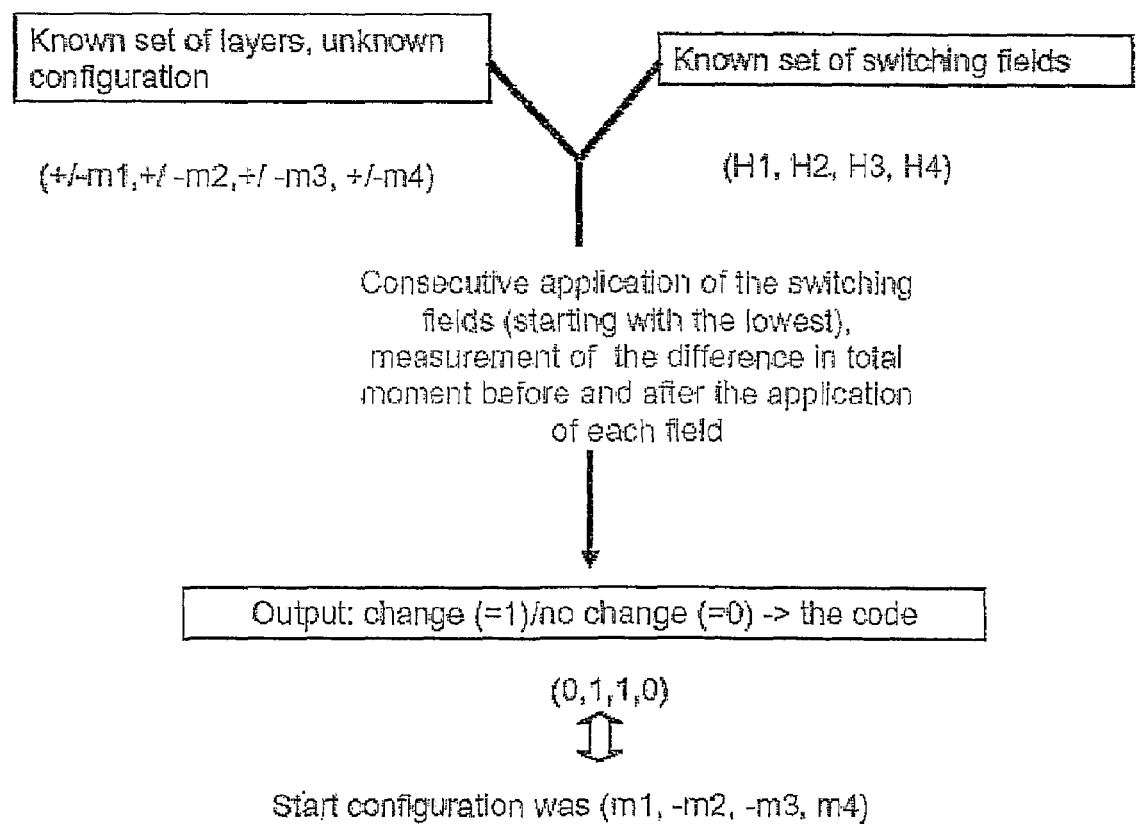
Figure 3A:
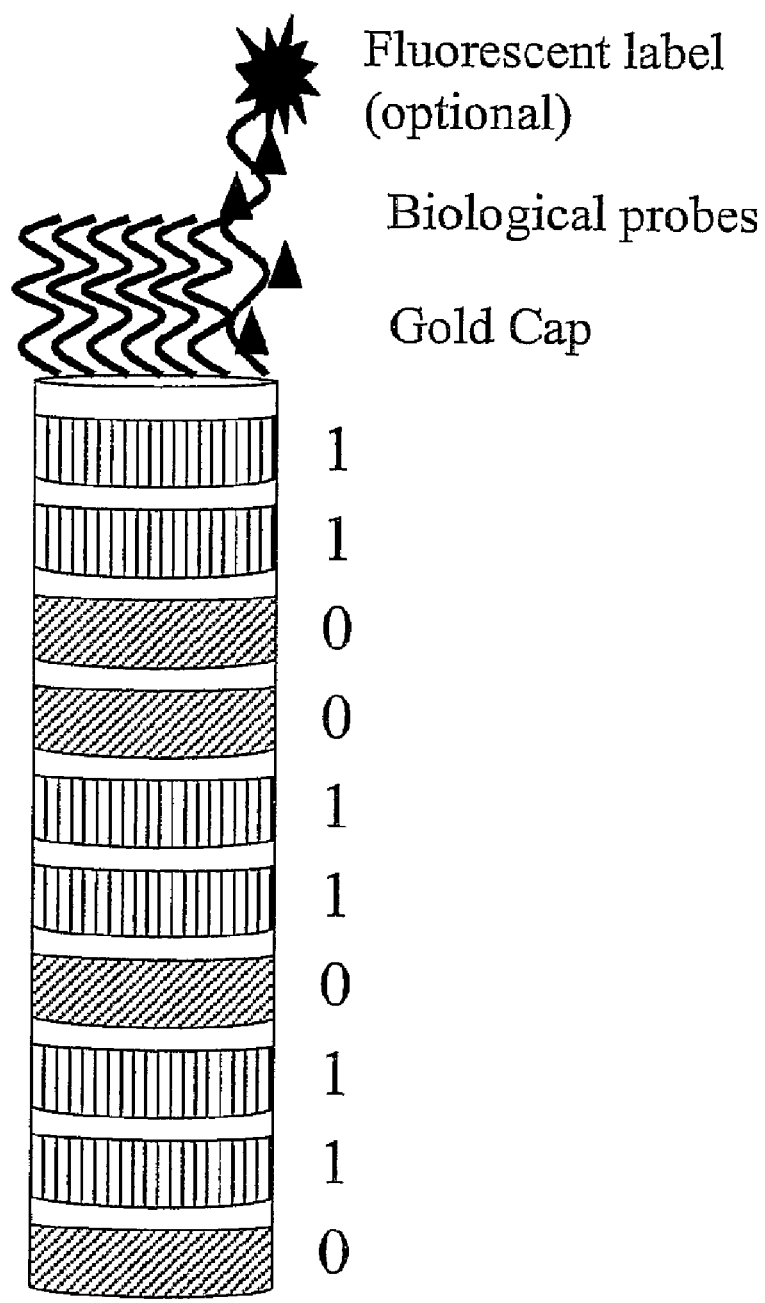
Figure 3B:
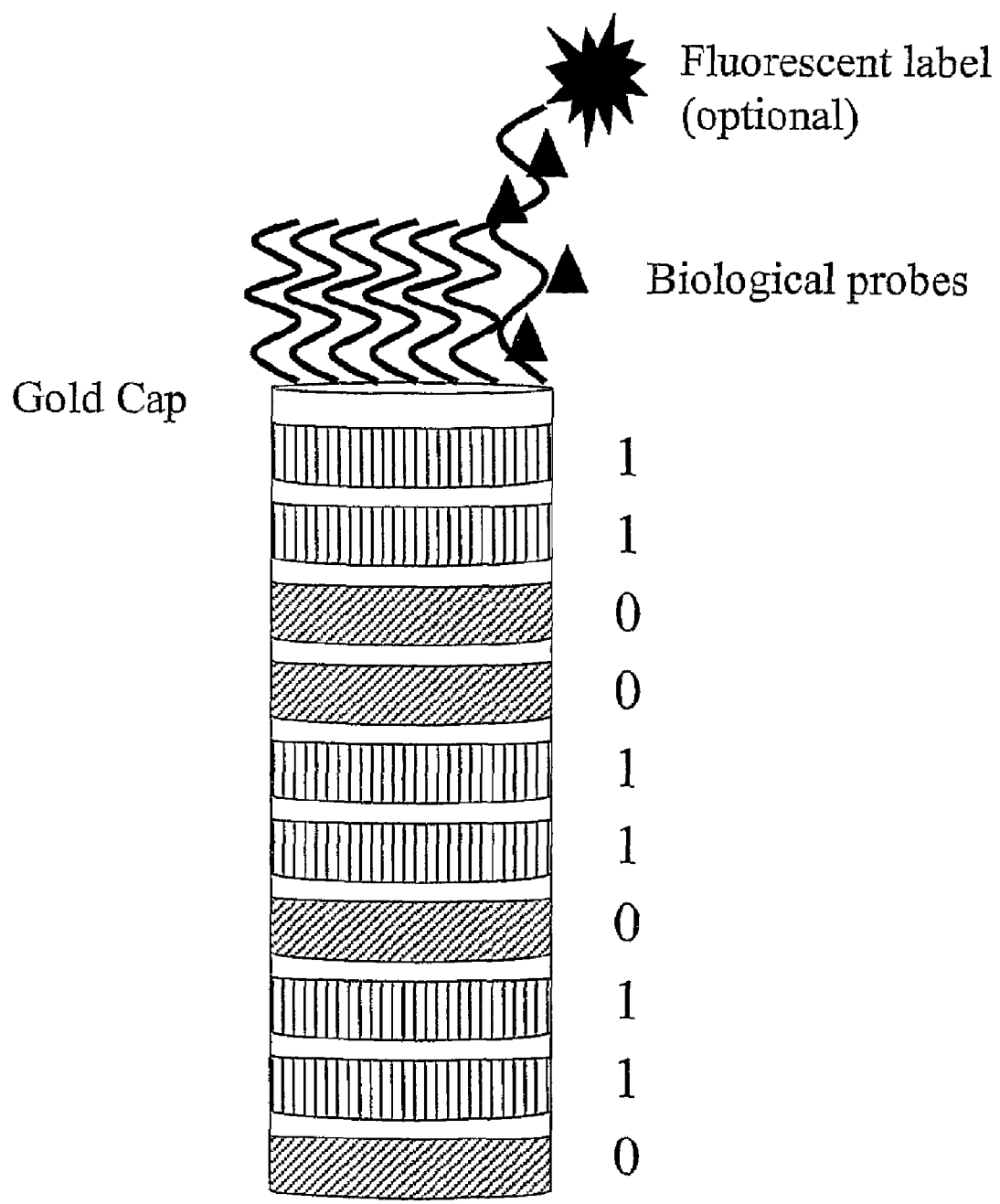
Figure 3C:
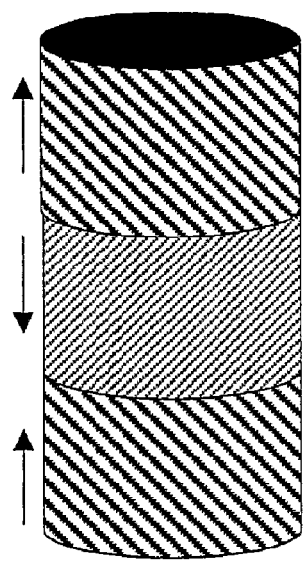

We next describe one basic operating principle with referent to the schematic diagrams of FIG. 1. (The tags shown in FIG. 1 are a schematic illustration of the tags shown in more detail in FIG. 3). In one embodiment of the invention, multibit (multicoerivity) magnetic elements (tags) are introduced into a channel through an inlet valve, placed in a predetermined orientation, and conveyed to the magnetic sensor by the micromanipulation system. The sensor detects the overall magnetic moment of the element, which is then recorded, e.g. by a computer, shift register or other data recording system. The elements are then moved from the sensor to a magnetic field generator, which applies a field $H_0$ sufficient to reverse the direction of a predetermined magnitude of magnetic moment $m_0$. The elements are returned to the sensor, which reads the overall magnetic moment again. This new moment is compared to the previously recorded moment, and any change between the two is recorded as confirmation of the reversal of the magnetic element corresponding to that particular magnetic moment. These reversals or lack of reversals corresponding to the known applied field (and thus to the inferred magnetic moment) form a binary code, which can be used to write and read information to the tags. The tags may then be conveyed to an outlet valve by a micromanipulation system and removed from the channel. Performing a sequence of such measurements with such an arrangement, applying a different field each time, then enables the detection and interrogation of the states of the separate magnetic bits of a multibit magnetic element, where each bit possesses e.g. a different magnetic moment, switching field, etc. This may be accomplished by arranging for the independent magnetic elements, for example, to exist as members of an increasing series of magnetic moments with corresponding switching fields. If the magnetic field generator applies a field H1 sufficient to reverse only the moment of the softest member of the ensemble M1, then the results of the first comparison C1 will depend only on the reversal or not of M1, without affecting the states of the other moments in the tag. The process can then be repeated for the next softest moment M2 and so on, until all elements in the ensemble have been reversed and the presence or absence of their change of state detected. A schematic diagram of this is shown in FIG. 2.

When the full series of measurements has been completed for the sequence of switching fields H, an array of comparisons C will have been produced, in which a change in the overall moment (i.e. a reversal) is binary 1, and vice versa. This can be combined in vector form with the array of moments m which the sequence H is known to reverse to provide a complete determination of the initial state of the tag, and thus a readout of its magnetic code R, via the relation:

$$R = m \cdot (I - 2C)$$

where I is the identity. For instance, if a sequence of measurements produces:

$$C = (1\ 0\ 1\ 0\ 1)$$

for $H = (H_1\ H_2\ H_3\ H_4\ H_5)$ giving $m = (m_1\ m_2\ m_3\ m_4\ m_5)$, then:

$$I - 2C = (-1\ 1\ -1\ 1\ -1)$$

Therefore $R = m \cdot (I - 2C) = (-m_1\ m_2\ -m_3\ m_4\ -m_5)$.

Advantages of embodiments of the technique are that it is not limited by the spatial resolution of the sensor; it provides a differential measurement and hence noise rejection. Preferably the sensor is sensitive and has a high signal to noise ratio.

Multibit Tags

We next describe some magnetic multibit tags suitable for tagging biomolecules, as shown in FIG. 3. FIG. 3a shows an example of a tag with a circular cross-section, FIG. 3b an elliptical cross-section. The examples show 10-bit tags which can encode up to 1024 different probes (this scales exponentially—a 32 bit tag can encode over 4 billion probes).

As in the example shown, the tag may be overall of cylindrical shape and comprise a series of magnetic cylinders each consisting of magnetic thin films of different thickness or composition up to 1 micron thickness separated by comparable thickness non-magnetic spacers. Magnetic shape anisotropy is used to achieve a preferred orientation of the magnetisation of each element or region, for example with magnetisation aligned in one of two possible directions along the axis of the tag (longitudinal uniaxial anisotropy). In another example the tag may comprise a series of magnetic regions in the shape of circular or elliptical disks each consisting of magnetic thin films up to 1 micron thickness separated by comparable thickness non-magnetic spacers of the same shape to make a bar tag of elliptical shaped cross section. Magnetic shape anisotropy is used to achieve a preferred orientation of the magnetisation of each element or region in one of two possible directions along the major axis of the ellipse transverse to the axis of the tag (transverse uniaxial anisotropy). The tags must be suitable for functionalisation e.g. gold coated so that suitable molecular or biological probes can be tethered to the tag. The tag can be fabricated using standard thin film deposition techniques (e.g. thermal evaporation, sputtering, electrodeposition) in combination with optical or electron lithography and pattern transfer; the tags must be capable of being functionalised with suitable molecular or biological probes and then released into solution by using a release layer such as aluminium. It is also possible to functionalise the tags after release into solution using standard biochemical techniques.

We now described how the total magnetic moment of a tag (or of one or more regions of a planar tag) may be interrogated to read data encoded onto a tag. The reading technique may be employed with equi-element tags as well with a multi-coercivity tags.

Figure 4A:
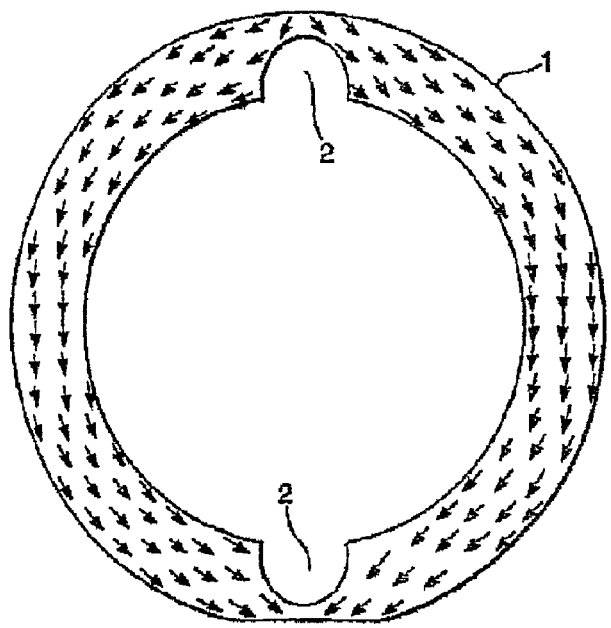
FIGS. 4a and 4b show tag sensing of the total moment of a magnetic tag in the shape of bead using a ring sensor as described in International PCT patent application PCT/GB01/03557.
Figure 3D:
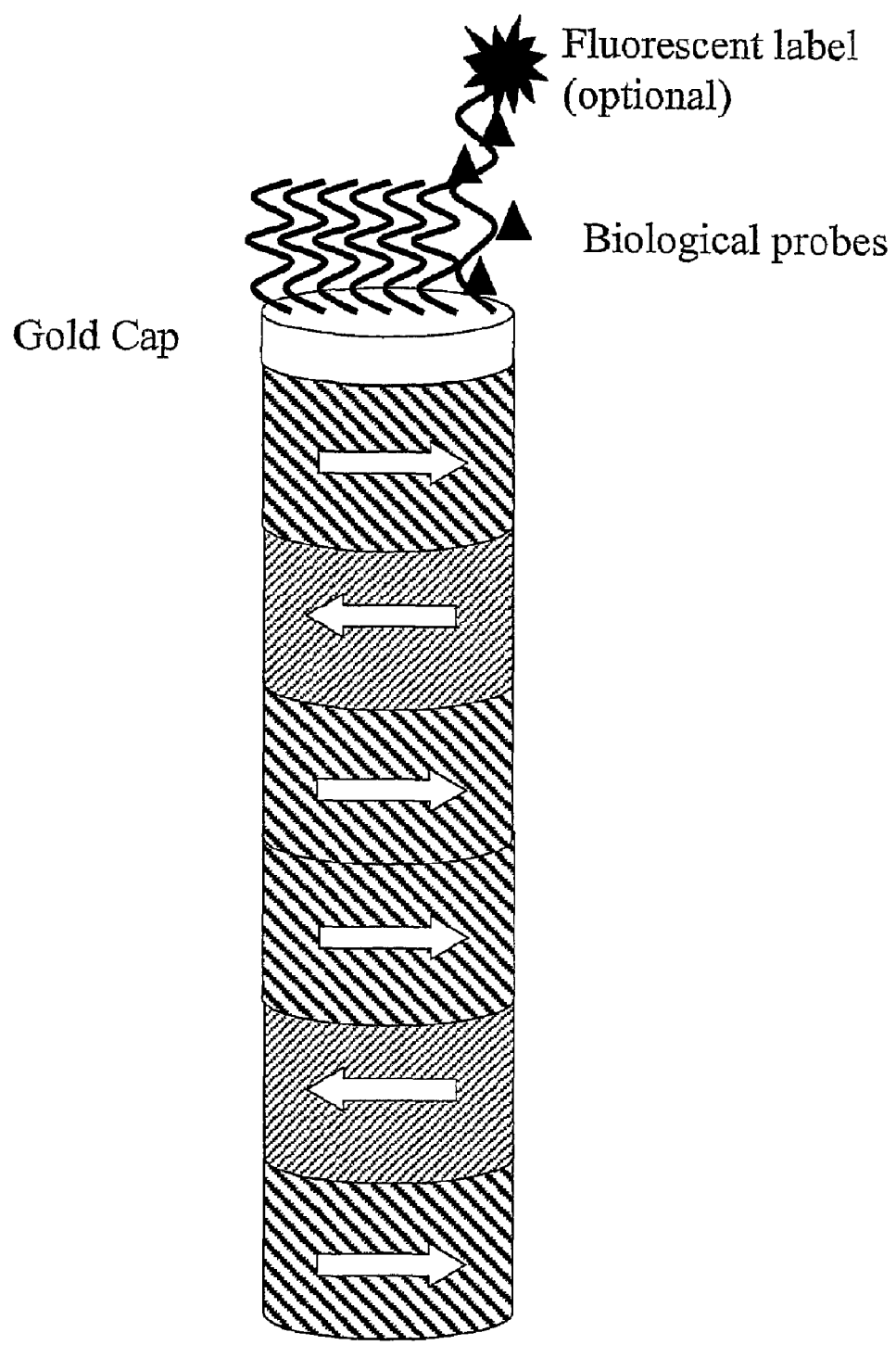
Figure 4B:
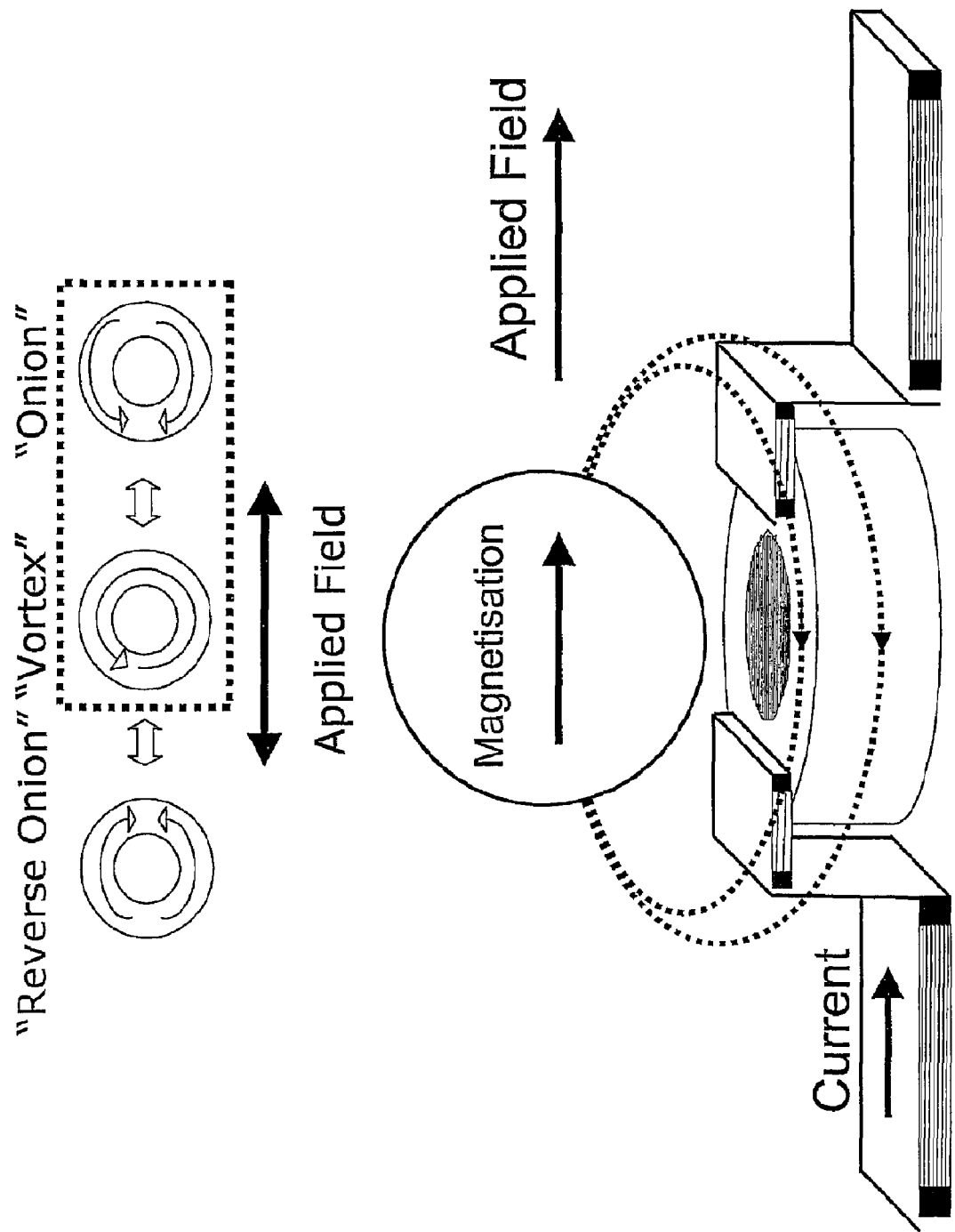

FIG. 4a is taken from US 2004/021539 (WO 02/13208) (hereby incorporated by reference), and shows a magnetic element which comprises a closed loop of ferromagnetic material having an even number of magnetic domains of opposite sense. The magnetisation within the domains is in a circumferential direction, and the domains have leading and trailing walls extending from the inside to the outside of this loop. The magnetic element has a geometry such that there are at least two stable equilibrium domain configurations in which the domain walls are confined in predetermined portions of the loop and wherein the element is switchable between the stable configurations upon the application of a external magnetic field. FIG. 4b shows how such a sensor may be used for a measurement of the magnetisation of a tag. The sensor cycles between ohim-high applied field—and vortex-remanence-configurations: The stray field of the beach (or other configuration) tag partially cancels the applied filed in the region below the head—that is, the presence of the tag alters the field experienced by the ring. Alternative sensors may be employed, for example GMR (giant magnetoresistance) ring sensors of the type described by C. A. Ross, F J. Castaño and colleagues.

Tag Data Writing

Figure 5A:
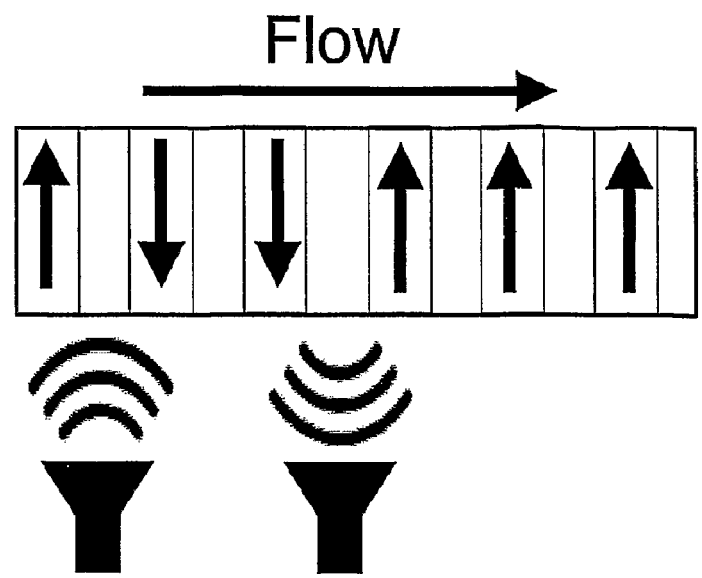
FIGS. 5a and 5b show tag writing.
Figure 5B:
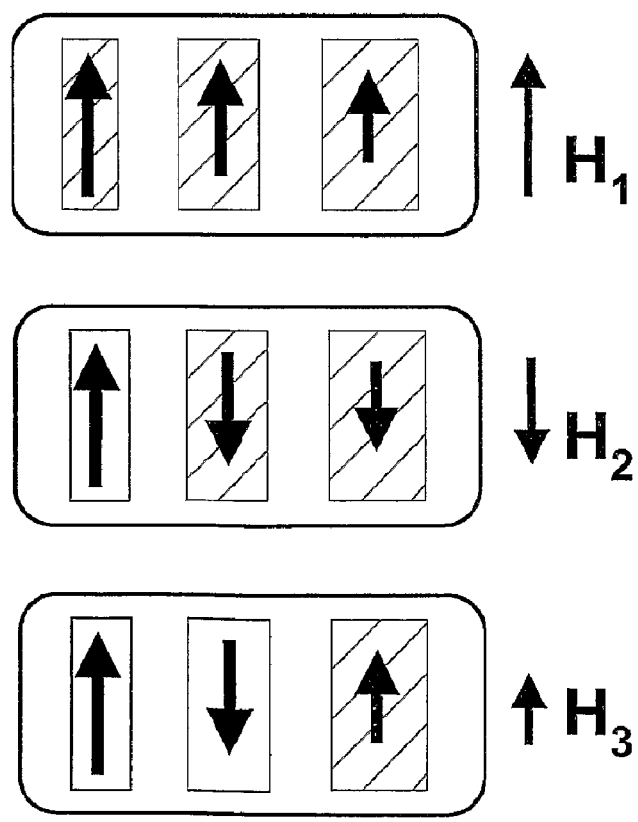

We next outline encoding techniques for the tags. Equi-element tags may be encoded by flowing the tags through a narrow channel to align them and encoding each bit sequentially with localised fields, as shown in FIG. 5a. A multi-coercivity tag may be encoded as a whole, as shown in FIG. 5b, with non-localised fields. An equi-element tag may be read by spatially resolved decoding, determining the state of each bit by direct interrogation. A multi-coercivity tag may also be ready this way, but in addition field resolved decoding (as described above) may be employed, the determination of the state of a bit being made indirectly by inference from a total magnetic moment of an entire tag. Decoding may employ, for example, magneto-optical or magneto-resistance—based sensing.

Referring again to FIG. 5b, this shows three steps in a method for writing a 3-bit multi-coercivity tag (the skilled person will readily appreciate how this technique may be extended to more bits). Each coding bit has a different switching field, $H_N$, and initially all bits in the tag are unaligned, with switching fields $H_1<H_2<H_3$. At step 1 a write head applies magnetic field $H_3$ to the entire tag, aligning all the bits. The write head (at step 2) then applies field $H_2$ to entire tag, which is only strong enough to realign bits 1 and 2. The write head finally (step 3) applies field $H_1$, which is only strong enough to realign bit 1. (The tags shows in FIG. 5 are a schematic illustration of the tags shown in more detail in FIG. 3).

Further Experimental Details and Results

We next detail some further experimental results relating to the fabrication of tags and to characterisation of their magnetic properties.

Figure 6:
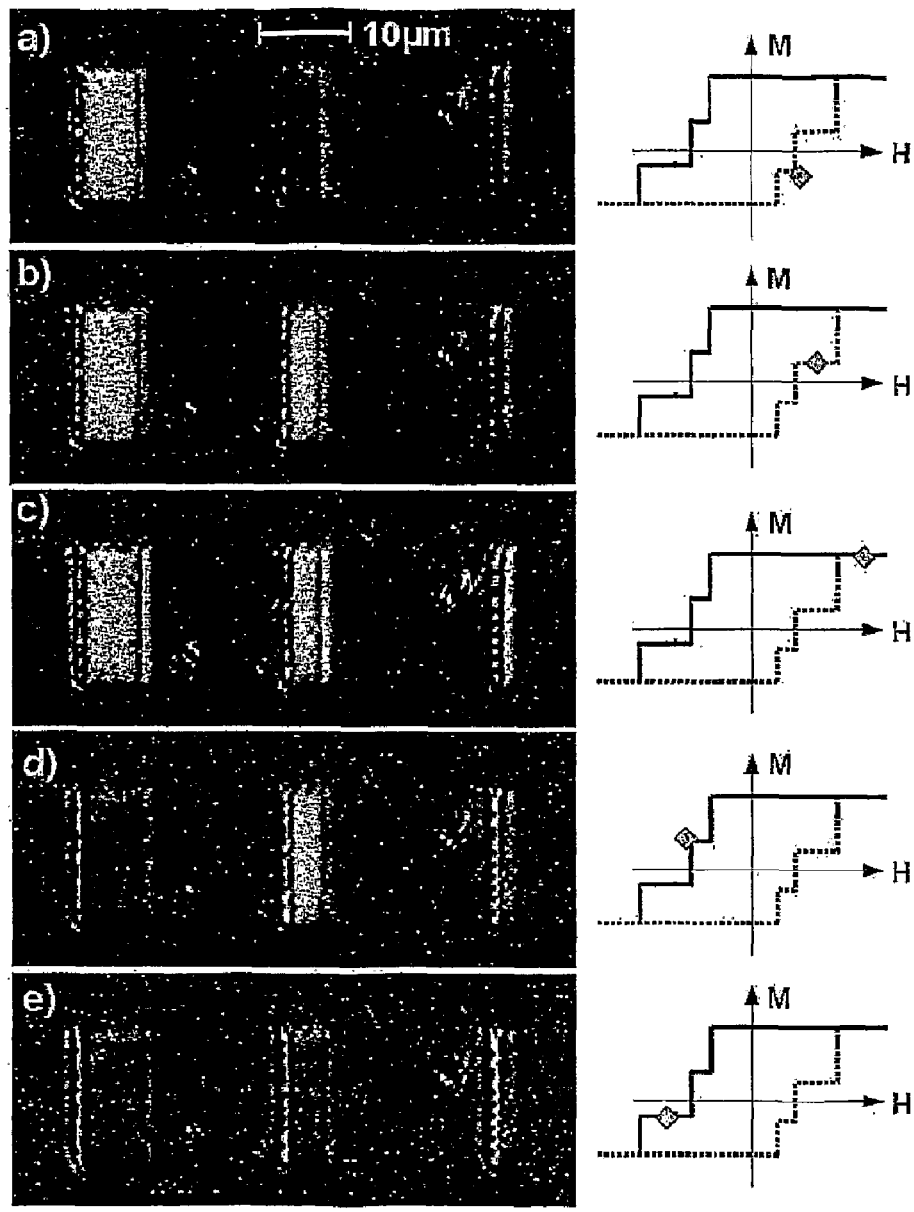
FIG. 6 shows magneto-optically detected size selective switching of rectangular Co tags using Kerr microscopy.

Magnetic tags fabricated from Co films using thermal evaporation were investigated using scanning Kerr microscopy based on the magneto-optic Kerr effect The magneto-optic Kerr effect (MOKE) is based on changes of polarisation and ellipticity of incident light upon reflection from a magnetic material. The electric field vector of the light couples to the spin of the electrons in the magnetic medium via spin-orbit interaction and thus experiences a change in phase and orientation, which expresses itself as the change in ellipticity of the reflected light. MOKE is widely applied as a magnetic characterisation method and yields hysteresis loops, showing the magnetisation vs. the external applied field (M-H loops). Quantitative analysis of M-H loops yields information such as coercive fields and anisotropy constants. Here MOKE was applied to study the general magnetic behaviour of the tags and their coercivity. Experimentally, MOKE is performed using a polarising microscope with a white light source, collecting the reflected light and analysing the change in polarisation upon reversal of the magnetisation by an externally applied (swept) field. Referring to FIG. 6, this shows the results for 3 thin film Co elements of different size in the micron range which switch at different field strengths as required.

Tagging Chemical and Biological Entities

Lithography and thin film fabrication techniques can be combined with patterning methods to create miniaturised (micron scale or smaller) multi-element tags from thin magnetic films. However with such a suitably miniaturised multi-bit magnetic (MBM) tag attached to biological or chemical entities there can be difficulty in reading or encoding the tag. A scheme for orientating and micro-positioning the tags together with the attached entities, for controlling their shape and structure so that they may be detected and combining them with an integrated miniature reading and writing apparatus would therefore also be of benefit. For example, if the structure is appropriately designed and such controlled positioning is achieved the magnetic tag can be read with sufficient reliability in a single pass. This problem is analogous to the problem sometimes encountered with a supermarket checkout scanner used to read a labelled object where the labelled object or product has to be swept or positioned over a reading system several times to ensure a reading.

We thus next describe a generic technology based on multi-bit magnetically encodable tags for the encoding and decoding of chemical or biological moieties. Specifically, the design and utilisation of microscopic multi-bit magnetically encoded tags capable of having or adopting one discrete digital code of a plurality of possible codes, are described. The MBM tag provides a binary code and every moiety associated with the tag is then uniquely encoded. Magnetic encoders/decoders allow the remote interrogation of each tag to determine each code. The tags can be encoded/decoded while they flow in a pumped liquid stream. A variety of moieties, such as nucleic acid, proteins, antibodies, antigens, cells, viruses, etc., can be conjugated with the tags. The main advantages of the proposed technology are, the ability to provide an extremely large number of discrete codes and the ability to rapidly and unambiguously read them. A device based on the proposed generic technology is also described for the ultra high throughput (UHT) screening and identification of many target molecules in a sample solution in a single experiment. A variety of applications of the proposed technology exist, including UHT screening of chemical or biological samples (bioassays), UHT genome sequencing and genotyping including single nucleotide polymorphism (SNP) detection, drug discovery, etc., depending on the specific moieties attached to the tag.

Binding bioassays such as immunoassays, receptor-based assays and DNA hybridisation assays have received great attention in the last few years because of their uses as diagnostics tests for a variety of target compounds. These assays exploit the ability of certain probe molecules to specifically and selectively bind (hybridise to) target molecules. In a solid phase binding bioassay, probe molecules are attached to a solid substrate (microarray or some other support) typically by the array manufacturer. Binding molecules can be antibodies, molecular receptors and strands of nucleic acids (DNA or RNA) that are capable of selectively binding to (recognising, hybridising) target molecules such as strands of nucleic acid, antigens, enzymes and other proteins, polymers and low molecular weight organic compounds such as toxins, illegal drugs and even explosives.

The end user initiates the assay by allowing the substrate to interact with a liquid sample and then the probe molecules immobilise the target and/or label molecules on the surface of the substrate via molecular recognition processes. If tagged binding molecules are used, a signal can be detected indicating the presence or absence of a target molecule (compound). A variety of tagging mechanisms have been proposed based on the exploitation of various physical and chemical properties of the label molecules, such as radioactive, chemiluminescence, fluorescence, enzymatic or other chemical tags. However, the number of tags that can be provided with distinguishable codes is relatively low and in addition, errors from various sources depending on the method employed, are introduced in the reading processes.

Some of the most significant binding bioassays are related to genome sequencing. The first draft of the human genome sequence was published in 2000 and the most important task is now to determine the function of each of the approximately 35000 human genes. The mammoth task of the Human Genome Project has taken more than 10 years and billions of dollars to complete. However, it is the genetic variation among individuals and the understanding of the gene functions that are the important tasks, if we envisage a future where the genetic predisposition of individuals to diseases can be known and where personalised drugs tailor-made to the genetic profile of an individual can be administered with minimal side effects and maximum efficiency. Simultaneous detection of variation at thousand of locations (single nucleotide polymorphisms, SNPs) in the genome and ultimately sequencing of the entire human genome of individuals are the high value targets of the biotechnology industry.

Spatially encoding methods, such as microarrays can be used for these tasks and assays, but their efficiency is severely limited by the number of probes that can carry, i.e. by the number of SNPs or gene sequences that can be simultaneously identified. Their high cost and complexity, the requirements for specialist operators and their relatively low sensitivity are factors that limit their applications. Nevertheless, applications of microarrays include gene sequencing, gene discovery, gene expression profiling and genotyping and microarray based screening is used in the pharmaceutical, healthcare and biotechnology industries as well as in academic research.

Tagged biological assays are used in genetic analysis and DNA sequencing. The percentage of the genome that is identical in all humans is about 99.9%. Hence, the significance of variations of single bases in the genome (SNPs) is very high and all the different characteristics of individuals can be attributed to variations. SNP genotyping is a particularly powerful technique for genetic analysis. A large number of SNPs are spread relatively evenly throughout the human genome providing a high density of polymorphic markers for use in linkage analysis and association studies. However, the power of these studies depends to a large extent on the number of SNPs that can be screened. The number of SNPs which can be analysed in an individual reaction is typically limited by the number of differently tagged probes available. There has therefore been a move towards running large numbers of reactions in parallel and to using microarrays. However, such arrays are expensive, inflexible and can only analyse a relative limited number of SNPs. Generally, the main limiting factor in these binding assays has so far been the inability to develop a method that can provide a large number of individually distinguishable tags.

Another field where the number of available codes and the nature of the encoding processes seriously limit output is in the generation of encoded chemical or biological libraries. The generation of large chemical or biological libraries comprising moieties synthesised by combinatorial chemistry methods has attracted great interest in the last years, especially by the pharmaceutical companies engaged in drug discovery. Synthesis of libraries on solid supports, such as microbeads, by, for example, the split and mix method can provide a very large number of compounds, since the number of compounds synthesised increases exponentially while the number of reaction steps necessary for the synthesis increases linearly. However, at the end of the process the compounds are mixed, so the only way to know what compound is on which bead, is if each bead is encoded. The tags that have been used so far are chemical in nature, but reading them is slow, destructive and, most importantly, limited to only a few library methods.

We describe a generic technology that utilises the encoding ability of magnetic materials. Bioassays utilising magnetic technology have been proposed and developed for the simple detection of the presence or absence of hybridised superparamagnetic beads. As an example, micron sized magnetic beads (typically superparamagnetic beads with magnetite particles dispersed in them) are functionalised with probe molecules that selectively bind to specific (complementary) target molecules which might be present in a solution. Magnetic sensors also functionalised with complementary molecules can detect the binding of the magnetic beads onto their surface and hence, the presence or absence of the target molecules in the sample is determined. However, this technology does not utilise at all the most important property of a magnetic object, namely its ability to be written and read and hence, provide an encoding mechanism that is inherently digital and can provide a very large number of unique codes.

The proposed technology comprises the design and fabrication of microscopic multi-bit magnetically encoded tags the associated encoders and decoders and their use in a flow system having microchannels. Generally, the technology provides a platform for carrying out drug-target interaction assays, genome sequencing assays, immunoassays, or any other type of binding assay based on molecular recognition processes. The assay can be tuned to the detection of specific target molecules by simply selecting the relevant probe molecules, i.e. for gene sequencing studies, nucleic acid probes are used, whereas for immunoassays, antibody probes are used. In another embodiment, the technology provides a generic technology for multiple analyte detection and analysis of human, animal and plant pathogenic organisms and pathogens. A generic technology for discovery and analysis of pharmaceutical (drug) candidates is also provided. In this embodiment, the compound synthesis can be carried out either directly on the tag itself that encodes during the synthesis or the compound can be conjugated with a pre-encoded tag. The compound species is then linked with the code carried by the tag by means of a computer database. In all cases, each MBM tag carries a code that uniquely identifies a single compound species that is attached to the tag. The advantages of the proposed methodology are that it is writeable, able to provide billions of codes, able to analyse thousands of compounds per second in a rapid, efficient, error-free and non destructive fashion.

We describe a generic technology for the encoding of chemical libraries utilising solid microscopic multi-bit magnetically encoded tags and magnetic encoders and decoders. In embodiments each and every compound member of the library carries one species (probe) and has a single magnetic tag that identifies it. The probes subsequently hybridise with the target analytes and are detected and analysed by magnetic decoders that decode the tagged probes. Analysis of multiple target molecules (analytes) in a solution that flows past magnetic sensors in microchannels is thus feasible. The unique correlation between each and every probe-compound of the library with its digital code is then revealed and the complementary target compound that has specifically bound and hybridised with its complementary probe uniquely identified. Features of preferred embodiments are the ability of the magnetic tags to carry one out of billions of codes, that they can be encoded (written) and decoded (read) rapidly and efficiently and the ability to write the codes on the tags during all the steps of the chemical synthesis, i.e. the ability to encode each compound member of the library while it is synthesised. Thus, chemical and/or biological libraries comprising billions of compounds can be encoded and screened in a single experiment.

The MBM tag in embodiments comprises ferromagnetic microelements or domains ("bits") placed on a solid substrate. The tag is a multibit tag and comprises at least two bits, where a bit is a physical entity capable of storing one piece of information. Each magnetic bit is able to adopt at least two different magnetic configurations. The magnetic configuration adopted by the bits in the tag defines the data stored in the tag. A bit capable of adopting two configurations is, in effect, a binary bit. The two configurations can be represented as 0 and 1 so that information stored is equivalent to one digit of binary computer language. As the number of bits increases, the amount of information or codes which can be stored in the tag also increases. Two bits will typically provide $2^2$, i.e. four codes, four bits will provide $2^4$, i.e. sixteen codes and so on and 32 bits will provide $2^{32}$, i.e. 4,294,967,296 codes. In one embodiment, the multi-bit magnetically encoded tags will comprise 2 to 100 or more bits, preferably 2 to 50 bits. Typically, the bits in the tag may be spatially defined and in particular in a defined order. This allows the bits to be encoded and decoded in sequence. Error correction and control bits may be employed to reduce errors in the stored data and/or to define a direction for decoding the tags.

Magnetic Microelements ("Bits")

The magnetic elements can be made from any suitable magnetic material, such as, but not limited to, Co, Fe, Ni or alloys such as NiFe, CoPt, CoFe, FePt, etc. In another embodiment, spacers made of non-magnetic materials are placed between the magnetic elements (bits) to magnetically isolate them (decouple them) from each other. The spacers can be made of copper or copper alloys or from other suitable materials. The magnetic microelements can be a few hundreds or preferably a few tens of microns long and a few tens or preferably a few microns wide. The microelements can be designed with various shapes and aspect ratios and their ends can be round or rectangular or elliptical or triangular or any other shape that is suitable.

In another embodiment, the bits may take the form of thin film magnetic multilayer structures comprising ferromagnetic transition metals. The tag may be produced by combining deposition with lithographic patterning and lift off techniques. Typically, the bits in the multilayer structure may be separated by non-magnetic spacer layers. The multilayer structure may, for example, be FM/NM/FM/NM where FM is a ferromagnetic metal and NM is a non-magnetic metal, for example, Co/Cu/Co/Cu/Co, etc, with a sequence of monotonically increasing FM layer thickness in the range 1-1000 nm and a standard Cu spacer layer thickness, e.g., from 1 to 100 nm, preferably 1 to 50 nm, more preferably between 5 and 30 nm. Alternatively, the FM layers can be replaced by ferromagnetic alloys, such as CoPt, FePt, etc, with controlled magnetic anisotropies resulting in controlled magnetic switching fields. Lateral size and shape control (disc, or ring, or ellipse, or square) may be achieved using optical/e-beam lithography and patterning employing traditional masking methods. The final structure may be achieved using standard lift off techniques based on e-beam exposed PMMA followed by development in a standard etch. Alternatively, the multilayer structure can be deposited directly onto a close packed planar array or supports, such as polystyrene microspheres. The complete tag may be designed according to micromagnetic computations so that the switching fields and interlayer dipole interactions can be carefully controlled as required to ensure the overall magnetic stability of the tag.

In another embodiment, the magnetic bits in a tag will comprise one or more closed loops (e.g. rings) of ferromagnetic material each having an even number of magnetic domains of opposite sense, the magnetisation within the domains being in a circumferential direction, the domains having leading and trailing walls extending from the inside to the outside of the loop. The magnetic bit may have a geometry such that there are at least two stable equilibrium domain configurations in which the domain walls are confined in predetermined portions of the loop and wherein the bit is switchable between the stable configurations upon the application of an external magnetic field. Such bits allow well controlled switching without complex intermediate states. An advantage of such bits is that they can be placed in close proximity with little or no interaction between the bits. This allows a high density of individual bits and very high speed switching. Stacks or arrays of such bits can be employed. In some cases a pair of such closed loops may be used for each bit. In such embodiments, non-magnetic spacing material may be present between each pair of loops. Preferably the loops employed will be circular. Preferably there are notches in the loop of ferromagnetic material, the domain walls being confined in a stable equilibrium at positions corresponding to the notches. Preferably, the loop has two or four notches although it may have more.

Figure 7:
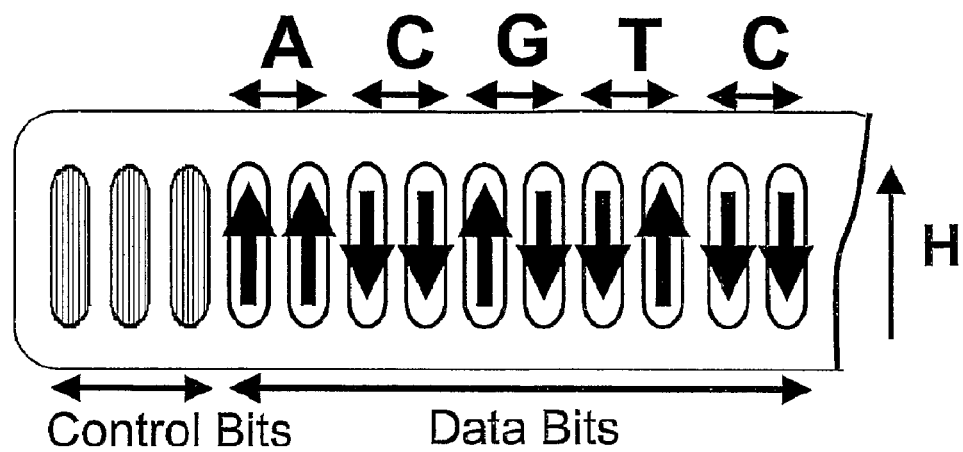
FIG. 7 shows a schematic diagram of a MBM tag with a chemical or biological moiety attached.
Figure 8A:
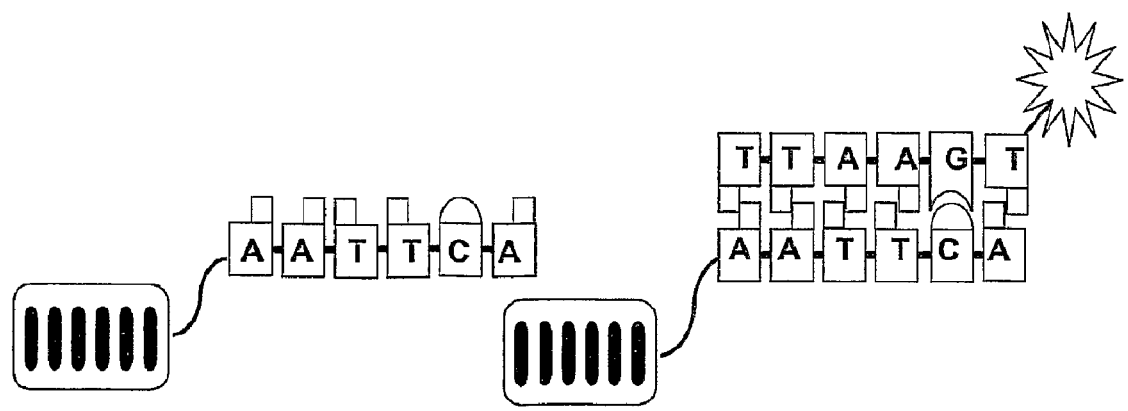
FIGS. 8a and 8b show schematic diagrams of a molecular recognition process as used in bioassays; the probe ligand specifically binds to its complementary ligand, if it present in the target sample.
Figure 8B:
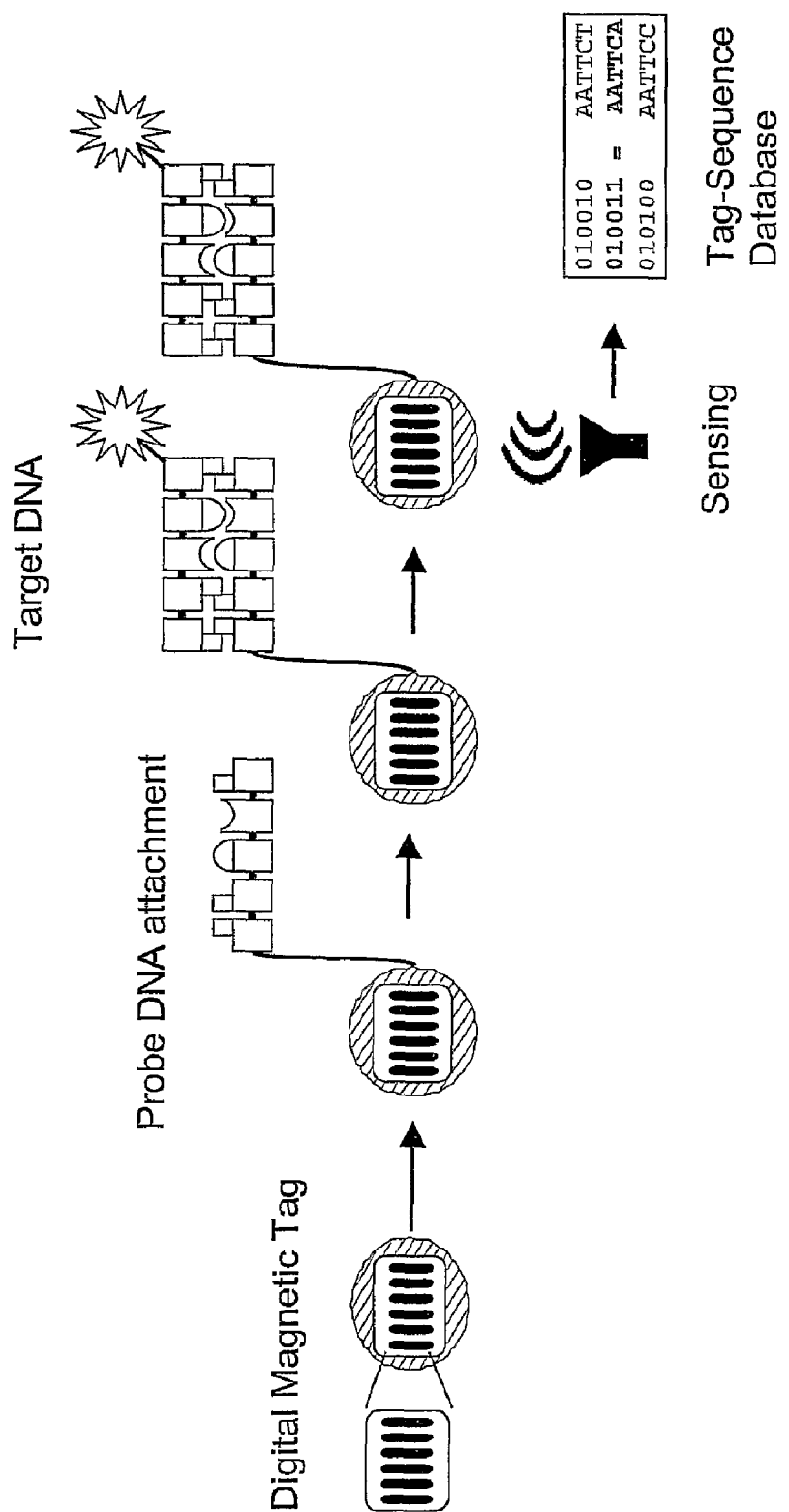

FIG. 7 shows a schematic diagram of a MBM tag with a chemical or biological moiety attached. The tag can be covered with or encapsulated into a protecting layer that may have a high affinity for the attachment of oligonucleotides, or nucleic acid, or proteins, or antibodies, or antigens, or cells or other chemical or biological compounds. FIG. 8a shows the probe MBM tag shown in the left hybridises to the complementary target sequence. FIG. 8b shows an example application of this technology. Such material can be, but not limited to, SU8, silicon nitride, silicon oxides, aluminium oxide, gold, gold oxides etc. The protecting layer can be a few nm thick, preferably between 5 and 500 nm, more preferably between 5 and 100 nm. (The tags shown in FIGS. 7 and 8 are a schematic illustration of the tags shown in more detail in FIG. 3).

The shape of the tag may be specifically designed to allow the tag to be oriented in a specific way during its flow through microchannels. This hydrodynamic focussing may facilitate the reading of the tag and in particular help the first and last bits of the tag to be distinguished from each other and hence the data to be read in sequence. In other embodiments, a greater proportion of the weight or volume of the tag may be distributed unevenly in one part of it to facilitate the orientation of the tag. In another embodiment, the tag may carry a magnetic dipole to determine the orientation.

In one embodiment, the multi-bit magnetically encoded tags are covered with a thin gold film and the molecular probes (receptors) have one end modified by a thiol group to immobilise them to the tag. Probe molecules can be natural and/or synthetic nucleic acids, or single stranded and/or double stranded DNA, or RNA, or proteins such as antibodies, or enzymes, or receptors, or streptavidin, or biotin, or protein A, or peptides, or other organic molecules. The probe molecules attached to the magnetic tags are designed to be complementary to the target molecules, for example nucleic acid probe sequences are complementary to target nucleic acid sequences. The active area of the probe-tags, defined as the total area coated with a binding molecule against a particular target species, is quite large, hence the chemical sensitivity of an apparatus, the design of which is based on this technology, used in a binding assay is quite high. Note that the chemical sensitivity is proportional to the active area of the detector; preferably the active area of the detector is the same as the active area of the probe-tags.

Fabrication of Free Floating Multi-Bit Magnetically Encoded Tags

In one preferred embodiment, the preparation of free floating tags employing SU-8 as the base material is accomplished as follows. Silicon is used as the substrate material, it is cleaned and prepared following the recipe described above. The substrate is then coated with aluminium of 10-20 nm thickness. The aluminium serves as a sacrificial release layer, i.e., it will be chemically dissolved in the last step. Then a SU-8 layer of 4-40 um thickness is spin coated on the aluminium. Micro Chem NANO SU-8 2000 is a negative photoresist which can be patterned using UV light of 350-400 nm wavelength. The resist is then soft-baked for one to two minutes at 65° C. in a first step and at 95° C. for two to five minutes in a second step. The exact soft-bake time depends on the thickness of the SU-8 resist layer.

In the first step of optical lithography the overall dimensions in x and y are defined, for example, if an overall tag dimension of 10×100 um is envisaged, then square elements of this size are defined on the mask. The exposure dose and time depends on the SU-8 thickness and is between two and ten seconds. After the expose a second two step baking process is required again at 65° C. and 95° C. for one and one to five minutes respectively. The patterned sample is then developed using MicroChem's SU-8 Developer for one to five minutes again depending on the SU-8 thickness, then rinsed in Isopranol and dried with clean air. In a final hard bake step the SU-8 is cured at 175° C. for five minutes.

Now that the substrate is prepared, it can be patterned following the exact recipe described previously, with the difference that the SU-8 bars serve as the substrate instead of the Silicon. The steps in brief are, spin coating the sample with S1813 (1.4 um thickness), soft-baking at 115° C., patterning of the S1813 on top of the SU-8 bars employing a second step of lithography. Then the S1813 is developed using MicroChem's SU-8 Developer for three minutes, this is one important difference to the recipe outlined above since the MF-319 is developer which is TMAH based and is used to dissolve the Aluminium release layer.

After the development is complete a layer of magnetic material and a capping layer of gold is deposited using thermal evaporation as described previously. Then the undesired material on top of the S1813 is removed using the Microposit Remover 1165. Finally, the release layer is dissolved using Microposit MF-319, cavitation enhanced within 10 s of minutes. The free floating tags are centrifuged and washed with the desired storage medium, such as water or methanol for further processing, e.g. attachment of chemical groups.

Magnetic Characterisation of Samples

As previously described the magneto-optic Kerr effect (MOKE) is based on changes of the polarisation and the ellipticity of incident light upon reflection from a magnetic material. The electric field vector of the light couples to the spin of the electrons in the magnetic medium via spin-orbit interaction and thus experiences a change in phase and orientation, which expresses itself as a change in ellipticity of the reflected light. MOKE is widely applied as a magnetic characterisation method and yields hysteresis loops, showing the magnetisation vs. the external applied field (M-H loops). Quantitative analysis of M-H loops yields information such as coercive fields and anisotropy constants. Here MOKE microscopy was applied for general magnetic characterisation of rectangular Co thin film tags and their coercive fields (see FIG. 6). The polarisation analysis is performed by measuring the intensity with a photodiode after the reflected lights has passed through a polarizer that is set to 90°±1° with respect to the polarisation of the incident light.

Encoding and Decoding of the Multi-Bit Magnetically Encoded Tags

An apparatus according to an embodiment of this invention is designed to encode, detect, read and decode the multi-bit magnetically encoded tags utilising magnetic field encoders and decoders. Any suitable type of magnetic devices that can be used for encoding/decoding the magnetic elements can be employed, such as those based on optical or magneto-optical or magnetoresistive (MR) methods or methods based on overall moment measurements or methods using electromagnets or permanent magnets or induction methods. In a preferred embodiment, encoders/decoders made of MR materials that have a high sensitivity and dimensions of a few nm or a few tens or hundreds of nm or more are employed. The encoders and decoders can be of a few microns or a few tens of microns in size. MR materials undergo a change in their resistivity with the change of their magnetisation. A magnetisation change can be induced by the stray magnetic field from a magnetic microelement. Thus a positive or negative electrical resistance change in an MR decoder can be related to the presence of a magnetic microelement with positive ("up", "1") or negative ("down", "0") magnetisation vector respectively, effectively reading the digital code from the microelement.

The materials of these MR decoders can be anisotropic magnetoresistive (AMR) materials in which the electrical resistance is a function of the angle between the magnetisation vector and the current flow direction. More preferably such materials can be giant magnetoresistive (GMR) materials or tunnelling magnetoresistive (TMR) materials which are magnetic multilayer structures comprising two or more magnetic layers separated by nonmagnetic layers (GMR) or insulators (TMR) [M. Megens, M. Prins, "Magnetic biochips: a new option for sensitive diagnostics", J. of Magn. and Magn. Mater. 293, 702 (2005) and Weifeng Shen, Xiaoyong Li, Dipanjan Mazumdar and Gang Xiao, "In situ detection of single micron-sized magnetic beads using magnetic tunnel junction sensors", Appl. Phys. Lett., 86, 253901 (2005)]]. The electrical resistance of the GMR/TMR materials varies with the relative alignment of the magnetisation between consecutive magnetic layers [R. Coehoom, "Giant magnetoresistance and magnetic interactions in exchange-biased spin valves", in K. H. J. Buschow (Ed), Handbook of Magnetic Materials, Elsevier, Amsterdam, 2003].

Magnetic field encoders (similar to write heads) comprising electromagnetic coils, the sizes of which may be few microns, tens or hundreds of microns, or a few mm or more. The magnetic field produced by an electric current (DC or AC or pulsed, the pulses width varying from sub-nanosecond to a few seconds or more) flowing through these coils can be used to reverse the magnetisation in the magnetic microelement, effectively writing/encoding information on it. In some cases an encoder and a decoder are located on the same head and may be similar to the ones used in commercially available hard disc systems, magnetic audio/video/data tape drives, floppy drives, etc (i.e. shielded inductive write head).

In some embodiments, the encoding of each bit may be achieved by applying a sequence of positive or negative fields in a specified direction so that each magnetic element contains, in effect, a digit of information, encoded as a magnetic moment which is either "up" ("0") or "down" ("1"). By tailoring the field strength and/or uniaxial anisotropy required for the switching of each element (or layer in the case of a multilayered tag) from high to low it will be possible to write information using an external field generated by the encoder head, without needing to position the write head precisely over each bit within the tag. As an alternative to in-plane anisotropy used, e.g., in the solid pillar tag, the hollow tube like tag (analogous to a pack of "polo mints") means that the orientation of the write field defines the direction of the magnetisation. In this case the write fields prepare a given ring element within the pillar into either the positive or negative "onion state" ["Observation of a bi-domain state and nucleation free switching in mesoscopic ring magnets", J. Rothman, M. Klaui, M. L. Lopez-Diaz, C. A. F. Vaz, A. Bleloch and J. A. C. Bland, Physical Review Letters 86 1098 (2001)].

The apparatus also uses fluidics systems which may be fully or partially automated. The fluidics systems comprise a structure with microns or mm or cm or tens of cm scale tanks (containers, reservoirs), channels, pumps and valves as necessary for the solution flow. The fluidics structure can be any plastic or thermoplastic moulded structure or a quartz or a glass structure comprising two or more parts bonded or attached together so that a solution-tight contact is ensured. The fluidics structures can be designed to be disposable if necessary. Pumps that do not have any valves and can be based on a diffuser nozzle design can be utilised to avoid the magnetic components associated with other pump designs that could disturb the flow of the magnetic tags.

The tags flow through microchannels with cross section dimensions of a few microns or tens or hundreds of microns or more, and with lengths varying from few microns to several cm. The cross section of the microchannels can be circular, elliptical, rectangular, square or any other appropriate shape. Writing and reading the tags may be achieved by passing the multi-bit magnetically encoded tags in a pumped liquid stream in which an encoder/decoder magnetic head array is located. The microchannels can be prepared with standard photolithography, or electron beam lithography or imprint or other suitable techniques and SU8 polymer or PDMS or quartz or glass or any other suitable material may be employed. The magnetic encoders/decoders can surround the microchannel the tags flow through in any arrangement necessary for writing (encoding) or reading (decoding) the tag. One encoder/decoder/sensor/read head/write head may be used, preferably two to four, more preferably four to sixteen or more. Arrays of encoders/decoders/sensors/read heads/write heads may also be utilised. The encoders/decoders may be coated with a thin insulating layer or passivating layer. The tags are detected when they come within the necessary distance of the decoder's surface, which distance can be tens or hundreds of nm or tens or hundreds of microns, typically a few microns.

The MBM tag flow may be controlled in the microfluidics system by magnetic fields generated using, for example, tapered strip lines (micron width non magnetic metal, e.g. Cu, strips which gradually reduce in width along their length and which are physically attached to the cell in which the tags are manipulated, written and read) or by external fields generated by an electromagnet. In some cases, a combination of hydrodynamic, electrostatic and magnetic forces may be used to align the tags with the shape of the substrate helping this process. In other embodiments, the flow of tags may be controlled by dielectrophoretic fields generated by conducting electrodes.

In some embodiments, the addition of a larger magnetic dipole moment anywhere on the tag or within the tagserves to act as a "magnetic tail" to allow determination of the orientation of the tag or alignment of the tags in a common orientation. Alignment may be achieved by applying an external magnetic field to the composite tag. The magnetic tails may be based on a large volume low magnetisation region in which the dipole moment is induced by the external field. The tag may be asymmetric so that alignment of the tag is induced by the torque resulting from the Zeeman field interaction between the external field and the tag.

Decoding the tags may in some cases require precise positioning and the tag may therefore need to pass the decoder/sensor/read head in a defined direction with a defined orientation within a controllable distance of the decoder surface. This may be achieved using the "magnetic tail" to introduce both alignment and near physical contact as the tag moves over the decoder within the flow cell. A biomagnetic cell constructed and its principal component may be a tube like channel or constriction etched within, e.g., a glass slide composite structure into which the strip lines and encoders/decoders/read-write heads/sensors are integrated. Many read/write heads could be in one or many positions along the microchannel or surrounding the microchannel or both, in order to: allow reading from more than one side of the tag (e.g.

top and bottom read/write heads for reading from both sides of the tag) and allow reading from a particular microelement arrangement (e.g. two read/write heads placed side by side can be used to decode a tag which has the code in two parallel strips of magnetic microelements) or from non predefined microelement arrangements. Multichannel flow cells comprising many microchannels can allow parallel writing and reading with increased flow rates resulting in increased throughput of the encoding/decoding process.

In some preferred embodiments, several of the magnetic microelements (bits), can be used as control bits to provide data verification, error correction, to define the direction the tag is flowing and the orientation of the tag. These control bits can be anywhere on or within the tag (for example on both sides of an elongated flat tag), they can be ordered in any appropriate way on the tag, or they may or may not be adjacent to each other, or they can be the two ends of the tag. The sizes of the control bits may or may not be identical to the size of the main microelements that are used for the encoding. The control bits may or may not consist of the same material as the encoding elements. The dimensions and materials of every control bit may or not be identical. In some cases they can consist of ferromagnetic materials (Fe, Ni, Co, FeNi, CoPt, FePt etc.) or superparamagnetic or ferrimagnetic materials. The same read/write head or heads as for the microelements used for the code in the tag may or may not used also for reading/writing the control bits, or special read/write head or heads may be used specifically for the control bits.

In other embodiments, superparamagnetic or ferromagnetic microbeads may be used instead of the multi-bit magnetically encoded tags. The elements and procedures described in this invention still apply and a device comprising flow microchannels equipped with magnetic sensors and the necessary electrodes for the manipulation of the beads, can be fabricated. Such a device can be useful in some specific biological assays where encoding of the biological compounds is not strictly necessary. In yet another embodiment, superparamagnetic or ferromagnetic microbeads that have different magnetic properties can be utilised.

Single domains of less than 500×20 nm can be detected with a GMR read head used in magnetic hard disc drives. The read head is generally of similar size while the flying height of the read head above the recording medium surface is less than 100 nm. The signal to noise ratio for these beads is 1000:1. The main problem associated with the use of GMR sensors for reading the tag is that the magnetic field falls off as $1/r^3$ with distance r between the tag and the sensor surface. The size of a sensor employed for the detection of the magnetic beads or tags may be the same as the size of the tag domains, while the surface to surface fly height should be approximately 0.2 a, where a is the radius of the bead, to achieve the required sensitivity. Note that this fly height includes the sensor passivation coating with the biological or chemical molecules, etc. Simulations show that a single domain spin valve with intrinsic sensitivity 0.06 Ohms/Oe, would be able to detect a 2 micron bead with magnetic moment $2\times10^{-12}$ emu, at a bead sensor clearance of 1 micron with a signal to noise ration of 7:1. Note that the sensitivity could be increased if TMR sensors are used.

Figure 9A:
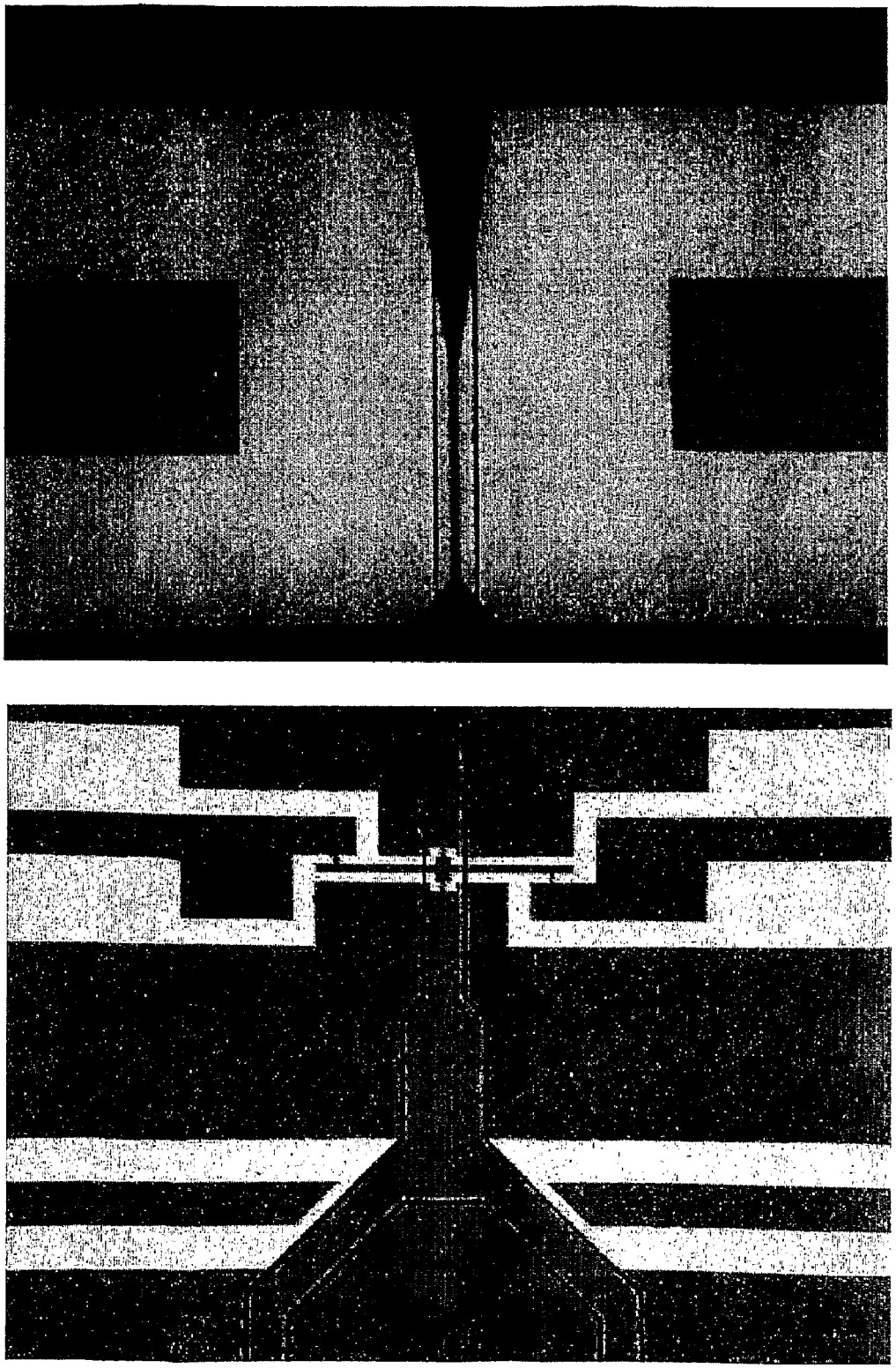
FIG. 9 shows a microfluidic chip with a channel configured to focus tags flowing through the system.
Figure 9B:
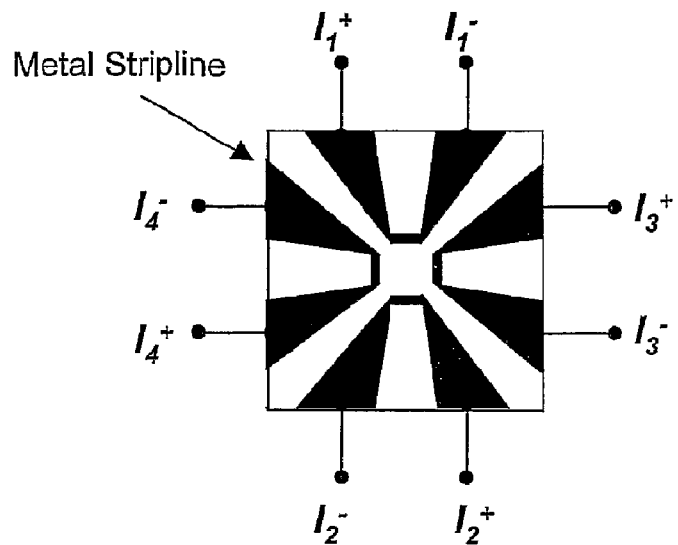
Figure 9B:
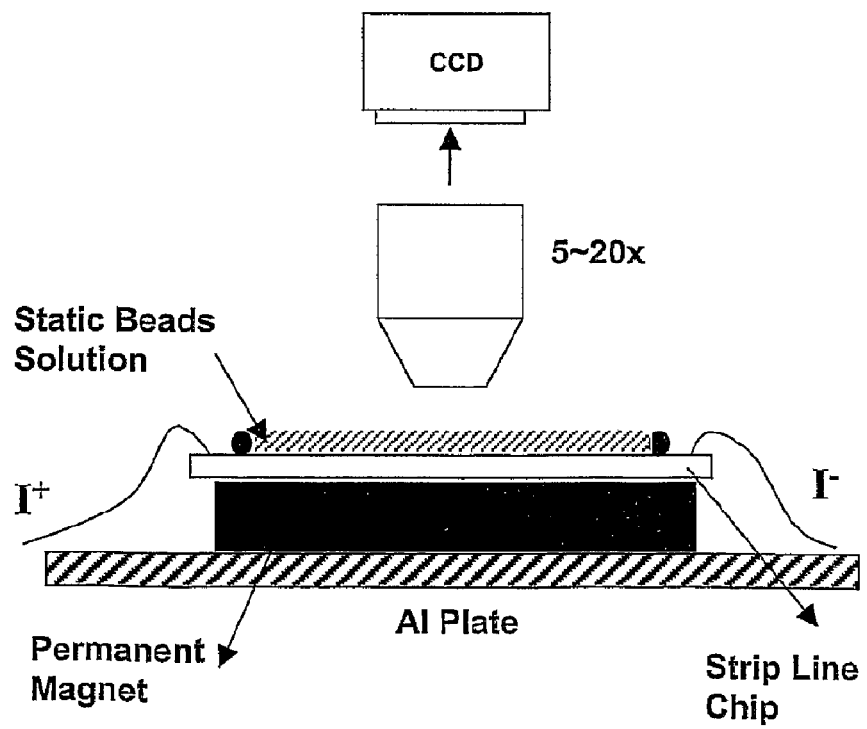

FIG. 9a shows a microfluidic chip with a channel configured to focus tags flowing through the system. Magnetic tags of lateral dimension 10 micron are focussed down the centre of the channel by 150 nm thick current lines. Sensors are insulated by a 500 nm thick layer of SU8 2000.5 before definition of a 75 microns wide Y-shaped channel in SU8 2025. Tags are sorted by current lines on either side of the channel carrying around 0.1 A, which draw the tags towards them when switched on by magnetic field gradients. FIG. 9b shows magnetic manipulation using on-chip striplines.

Figure 10A:
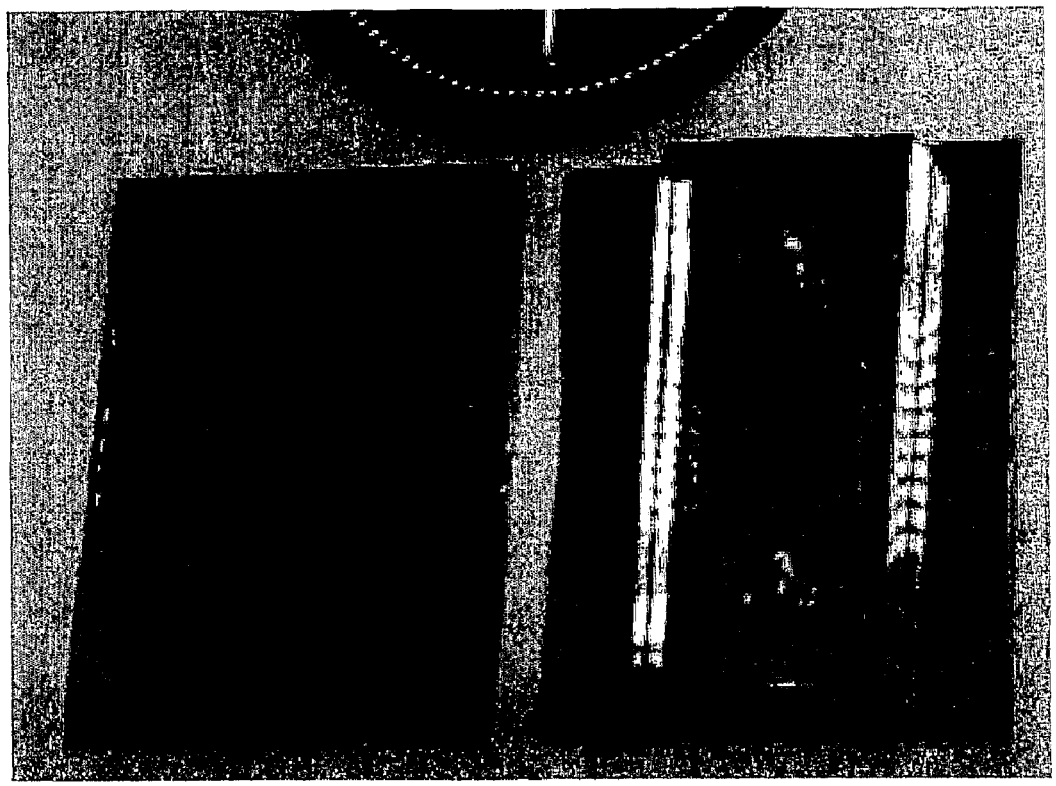
FIG. 10 shows further diagrams of a microfluidic chip with a tag manipulation system.
Figure 10A:
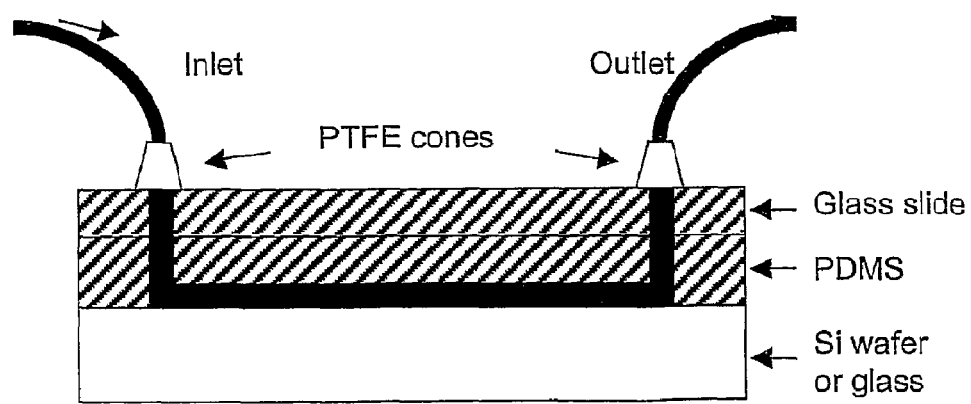
Figure 10B:
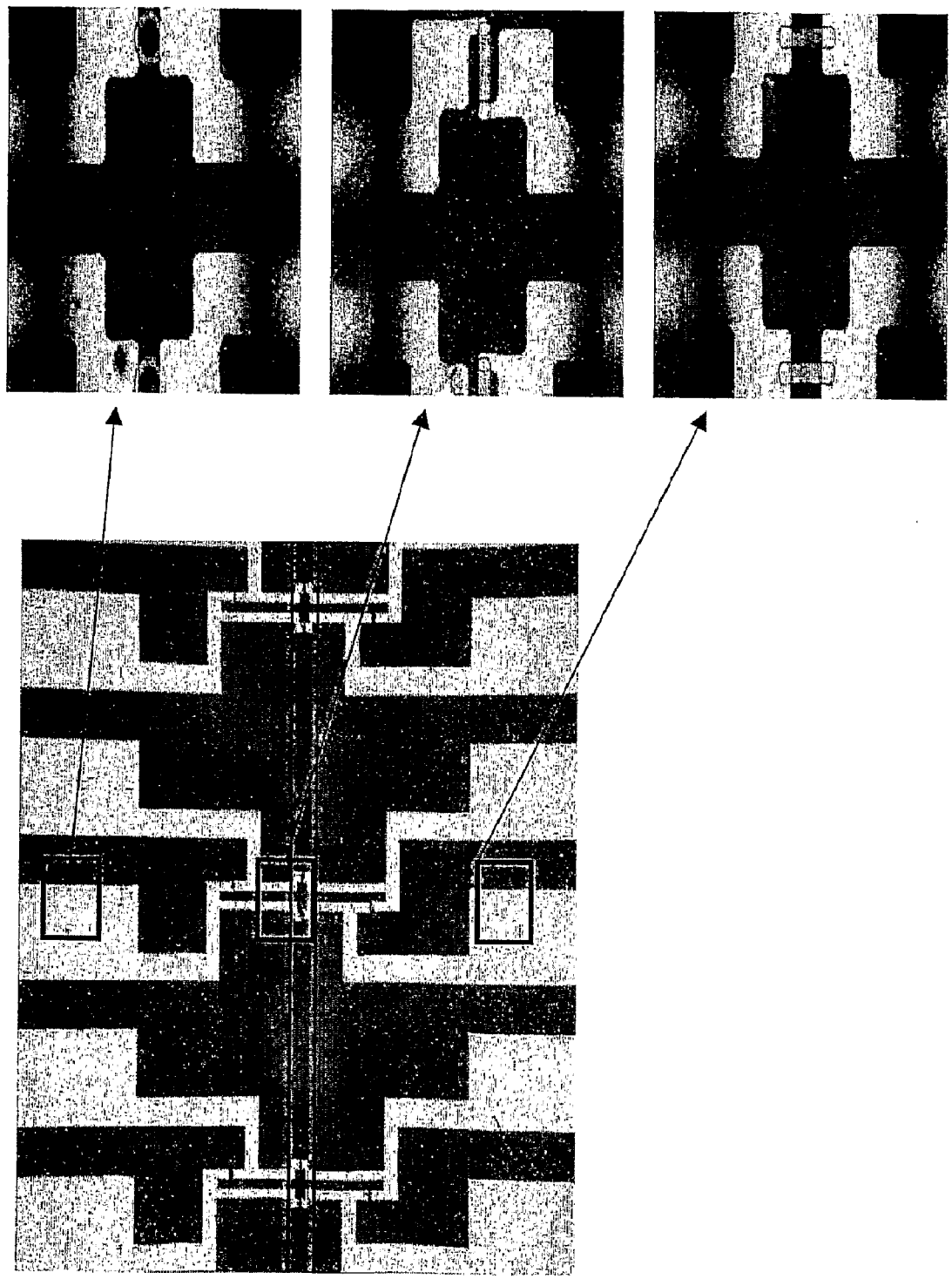

FIG. 10 shows aspects of a microfluidic chip, and magnetic tag manipulation. FIG. 20b shows examples of three types of AMR ring/block sensor: 10 micron ring sensors and block sensors parallel and perpendicular to the sensed channel). These were fabricated by MBE (Co (8 nm)/Au(2 nm), with evaporated contacts of Au(5 nm)/Al(150 nm)/Au(5 nm) to complete wheatstone bridges).

Figure 11:
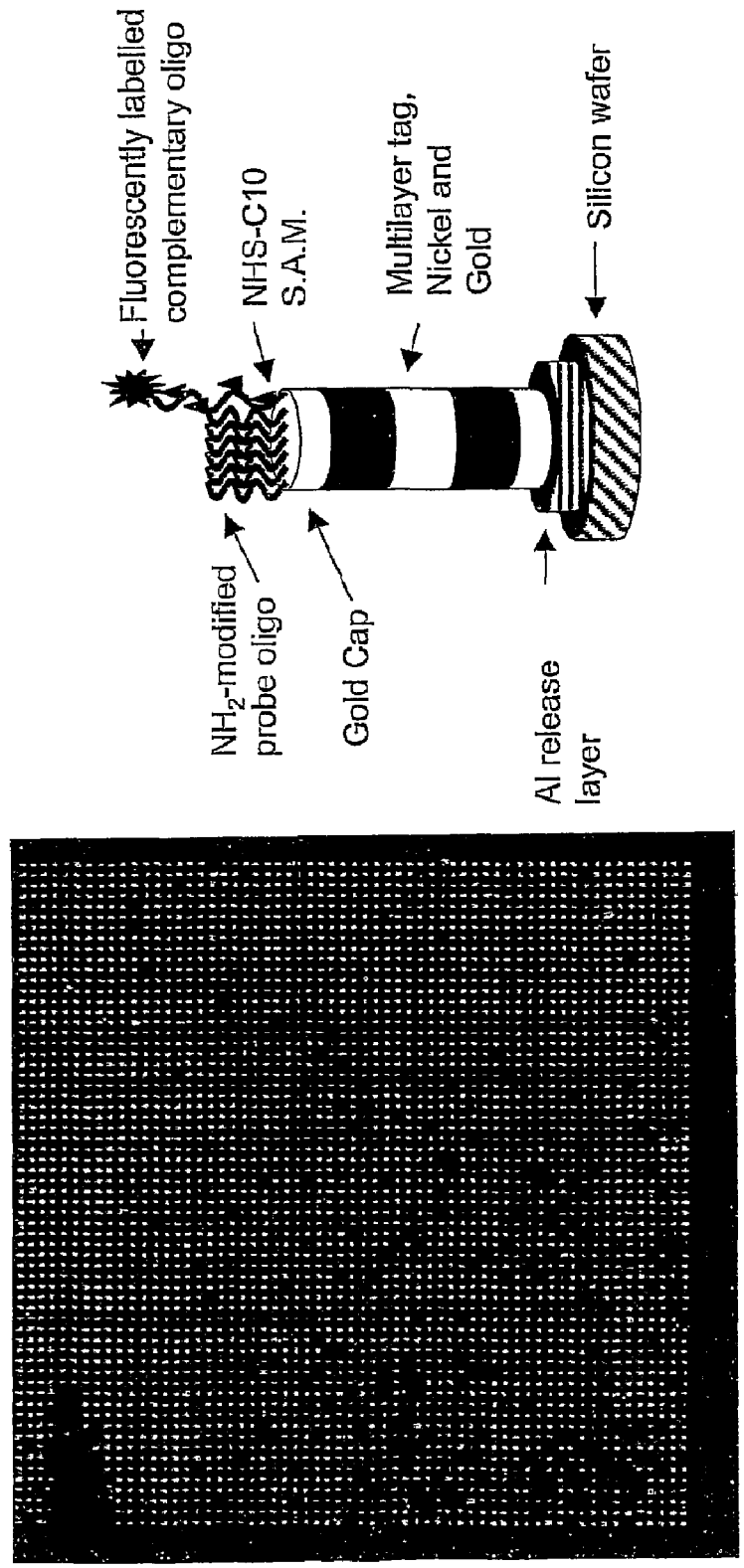
FIG. 11 shows a CCD fluorescence scan of a 63×61 array of gold capped magnetic Ni/Au multilayer pillars of 15 micron diameter which have been functionalised (see inset). The sample geometry is also shown schematically.

FIG. 11 shows a CCD fluorescence scan of a 63×61 array of gold capped magnetic Ni/Au multilayer pillars of 15 micron diameter which have been functionalised (see inset). The sample geometry is also shown schematically. The pillars are functionalised with a dithiol self-assembled monolayer which binds a primer oligo [5'-3': $NH_2$-TTTTTTTGACAC-CGTCATCAGCAG]. The image shown is after hybridisation with a fluorescently tagged template oligo [5'-3': Fluorescein-GACTACTGCTGCTGACGGTGTCATA], demonstrating the overall success. In the schematic showing the structure of the functionalised tag, the aluminium release layer can be dissolved to allow the tags to flow and be read in a microfluidic channel.

Figure 12:
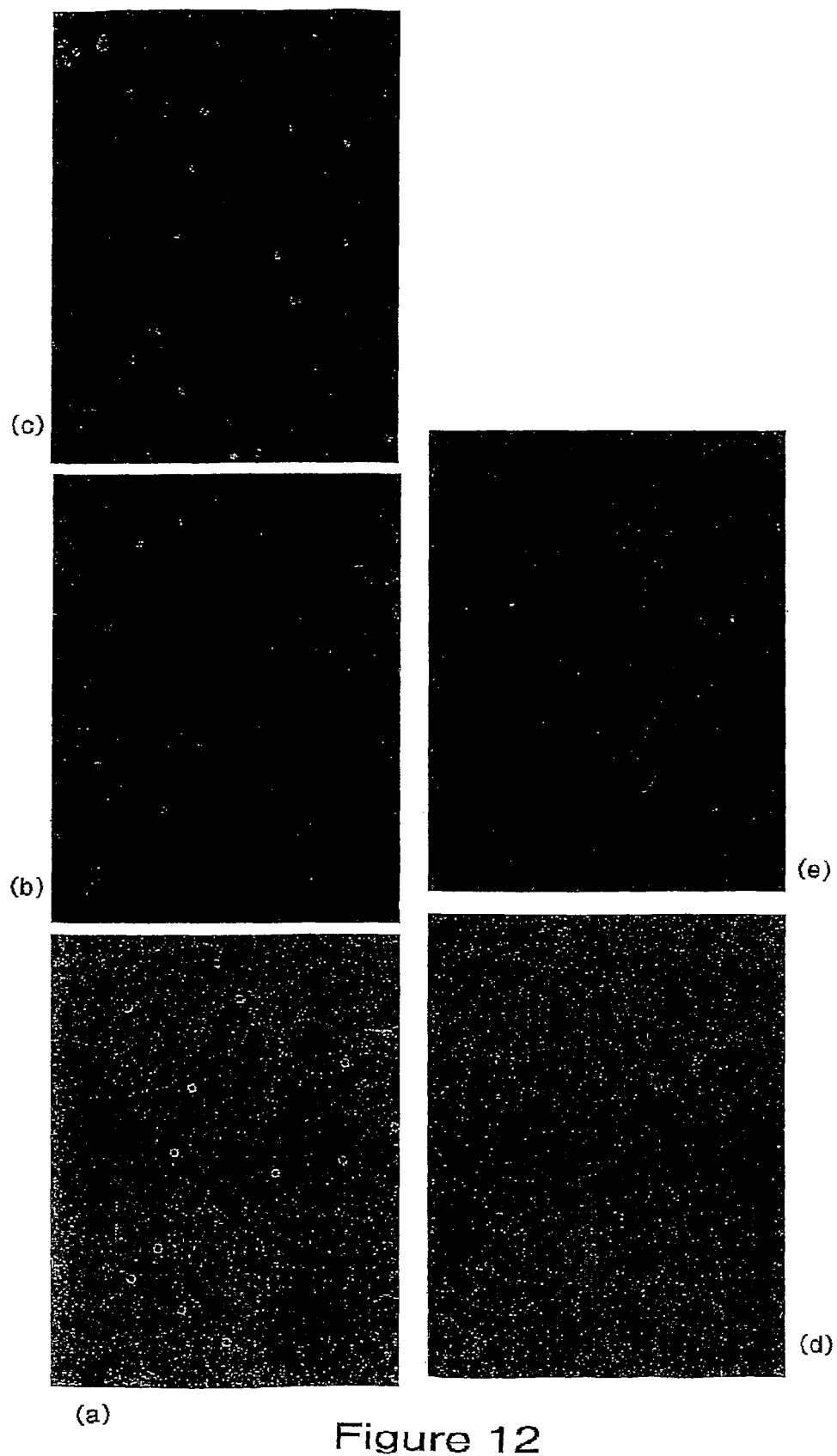
FIG. 12 shows optical images of 5 micron magnetic and polystyrene beads which have been functionalised and recognised using optical fluorescence (see inset).

FIG. 12 shows optical images of 5 micron magnetic and polystyrene beads which have been functionalised and recognised using optical fluorescence (see inset). FIGS. 12a to 12c show a 40× image of a mixed sample of 5 micron diameter fluorescently hybridised magnetic and polystyrene bads. The streptavidin coated beads (from (Spherotech) were reacted with biotinylated oligonucleotide 'probes' {Magnetic: TTTAGCGTGTGCTGAGTGTTGCCTCG; Polystyrene: TTTTTTTATGACACCGTCATCAGCAG} and then hybridised with fluorescent complements {Magnetic: [Fluorescein-TTTCGAGCCAACACTCAGCACACGCT; Polystyrene: [Tetramethylrhodamine-TTTTTTCTGCTGAT-GACGGTGTCATA}. In figures b) and c) we only see the magnetic (green) and polystyrene (orange) beads respectively. FIGS. 12d and 12e are 20× images post-magnetic-sorting, taken from the magnetic channel. All 11 beads shown in the brightfield image are shown to be magnetic by the fluorescent image of the same area. The beads in the circles are artefacts of a 'dirty' microscope so are to be ignored.

FIG. 13 shows: an overview of the design of the integrated microfluidic device (cell). More particularly the Figure shows apparatus for separating chemical or biological molecules or moieties each individually attached to a MBM tag miniature multi-bit magnetic tag capable of adopting a plurality of remanent magnetic configurations corresponding to binary information.

Figure 13A:
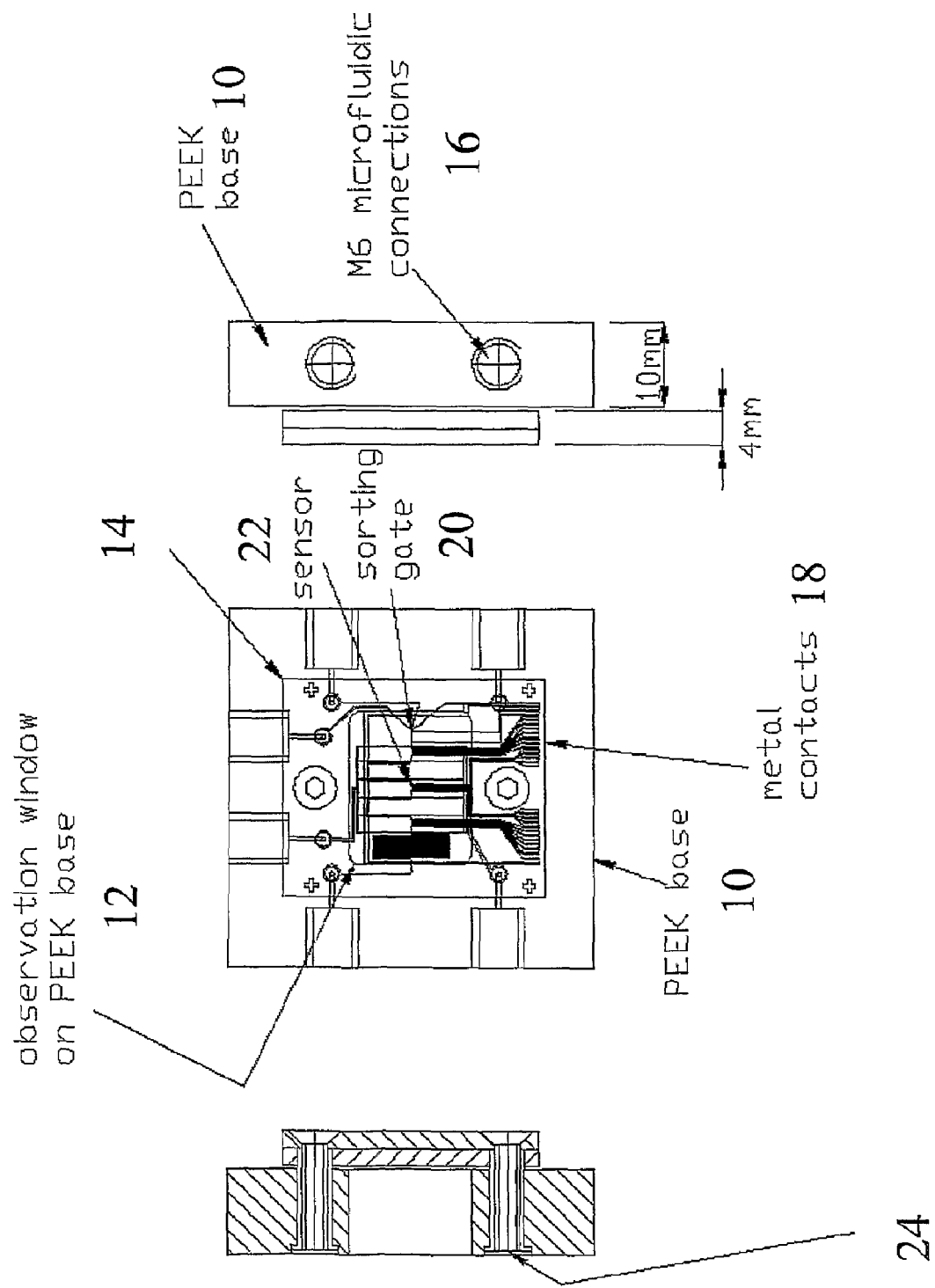
FIG. 13 shows:
a) An overview of an integrated microfluidic device.
b) The microfluidic channel geometry for controlling the flow of the tags and the channel structure.
c) The sensor configuration in the integrated device.
d) The write line configuration.
e) The sorting gate.
f) The magnetoresistive read head.

Referring to FIG. 13a, the apparatus comprises a microfluidic flow channel incorporating strip lines or electrodes to control the position and orientation of the tags via one or more electric and/or magnetic field. The device also includes a switch (sorting gate) to direct the tagged molecules or moieties to a selected output responsive to read binary information.

The device has two PMMA pieces bonded together 14, a (square) PEEK base 10, an observation window opened on a PEEK base 12, (M6) microfluidic connections 16, metal contacts 18, a sorting gate 20, and a sensor 22. M3 dowels 24 locate the chip.

More particularly the device has microfluidic channel geometry for controlling the flow of the tags and the channel structure; the sensor configuration in the integrated device; the write line configuration; the sorting gate; a magnetoresistive read head geometry (based on Anisotropic magnetoresistance) with barber pole bias.

Figure 13B:
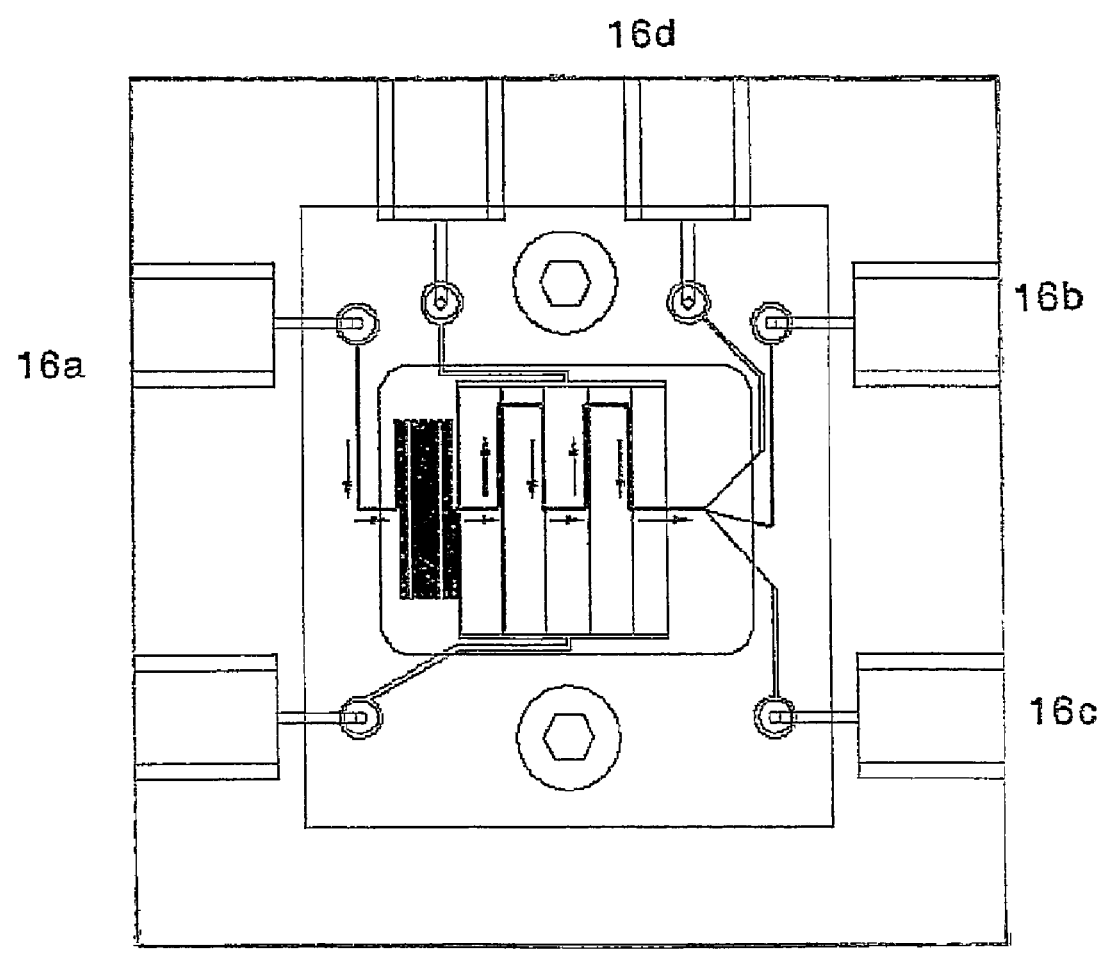

Referring to FIG. 13b, the arrows show the route of a tag through the device (IMC). The device has fluid inlets which provide sheath flows at six points on the chip to confine tags to flow along the central line of the channel; a tag injection inlet 16a (top left), a delay line to separate tags in flow; an outlet 16d for waster or non-magnetic samples (top right); and outlets for magnetic tags 16b,c (right).

Figure 13C:
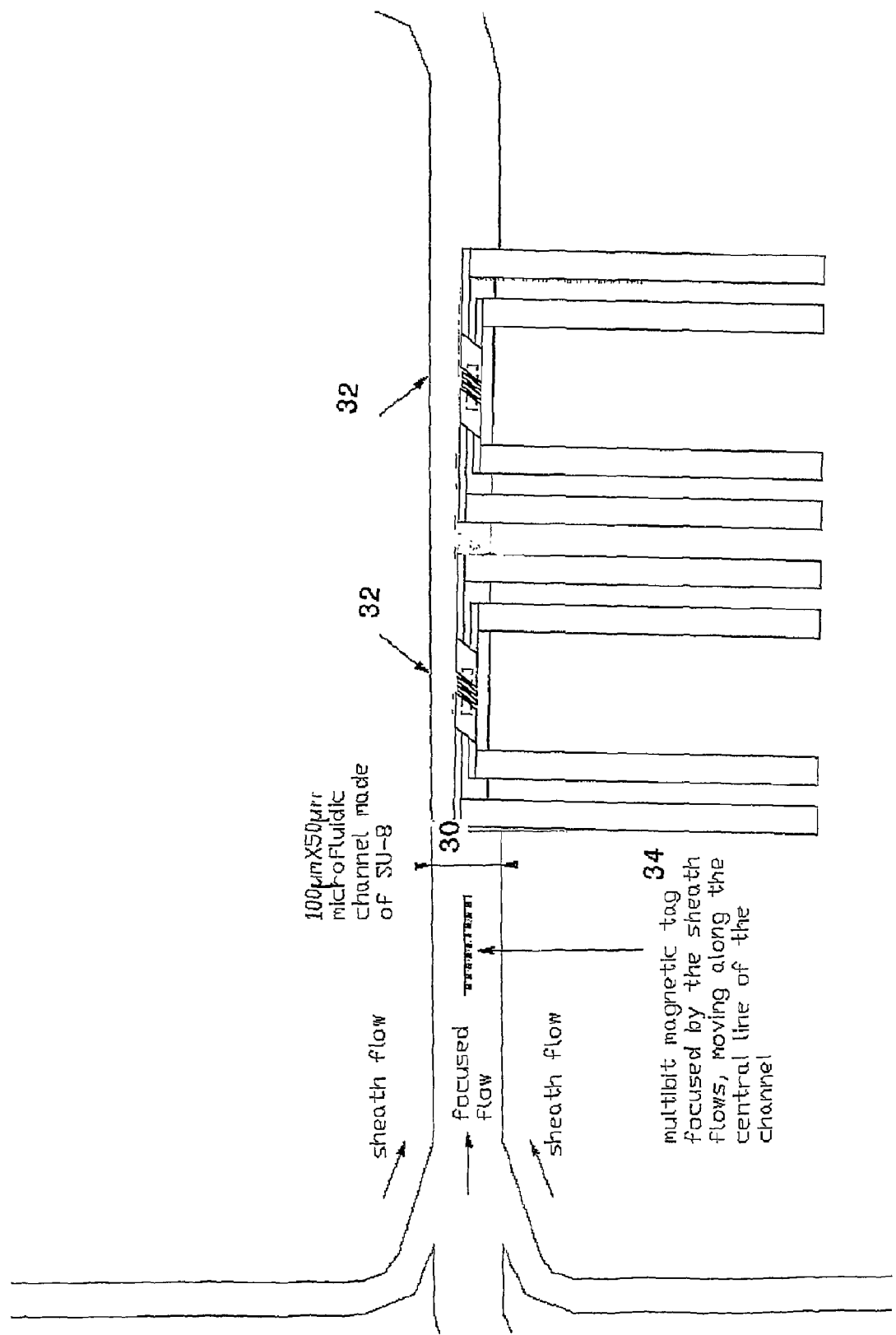

Referring to FIG. 13c, this shows a 100 μm×50 μm microfluidic channel 30 made of SU-8. 40 μm×8 μm rectangular barber-pole AMR sensors 32, each connected with 4 contacts, are buried at the bottom of the channel along the central line, with an insulation layer on top so as to prevent contact with process fluid. Each of then can be wired into a bridge to differentially sense the magnetic movement of an individual tag passing overhead. The Figure shows a multibit magnetic tag 34 focused by the sheath flows, moving along the central line of the channel.

Figure 13D:
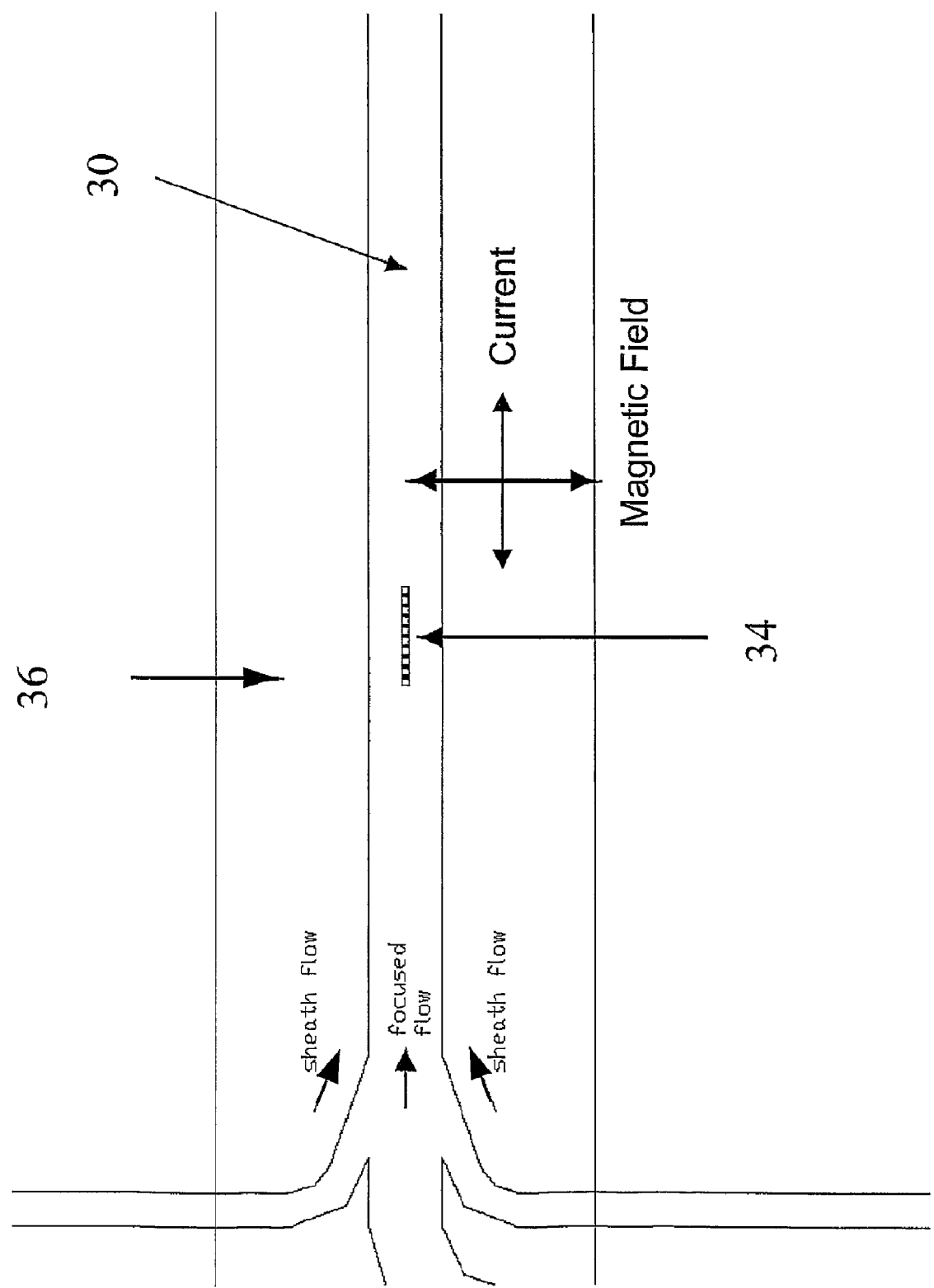

Referring to FIG. 13d, this shows a 500 μm wide metal line 36 buried underneath the channel and insulated from the process fluid in the channel can carry current impulses of different intensities in either direction along the line. As the tag 34 flows overhead along the central line individual bits with different coercivities can be influenced by the magnetic field induced in the direction perpendicular to the flow. Only a bit with a coercivity equal to or lower than the induced field will be switched.

Figure 13E:
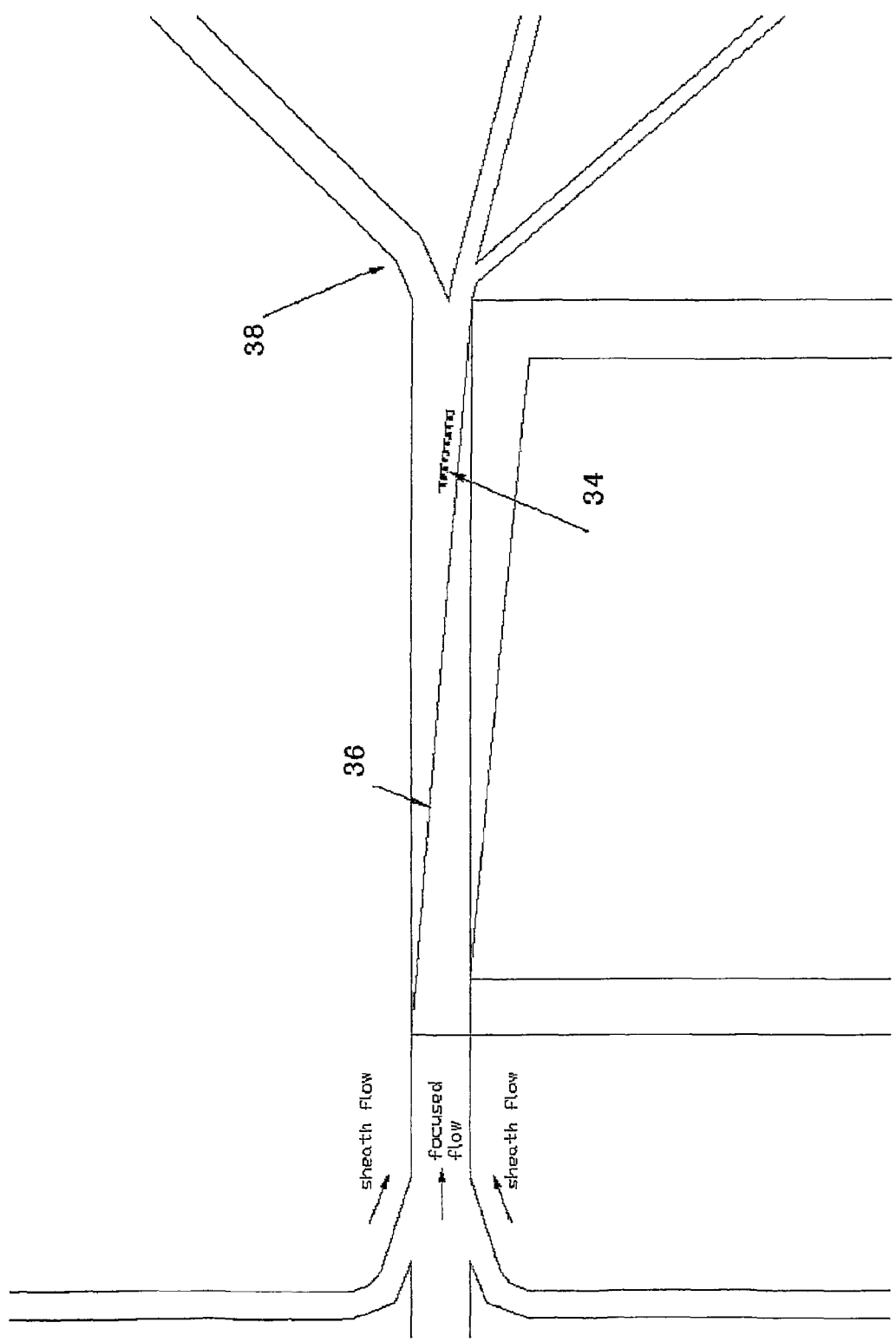
Figure 13F:
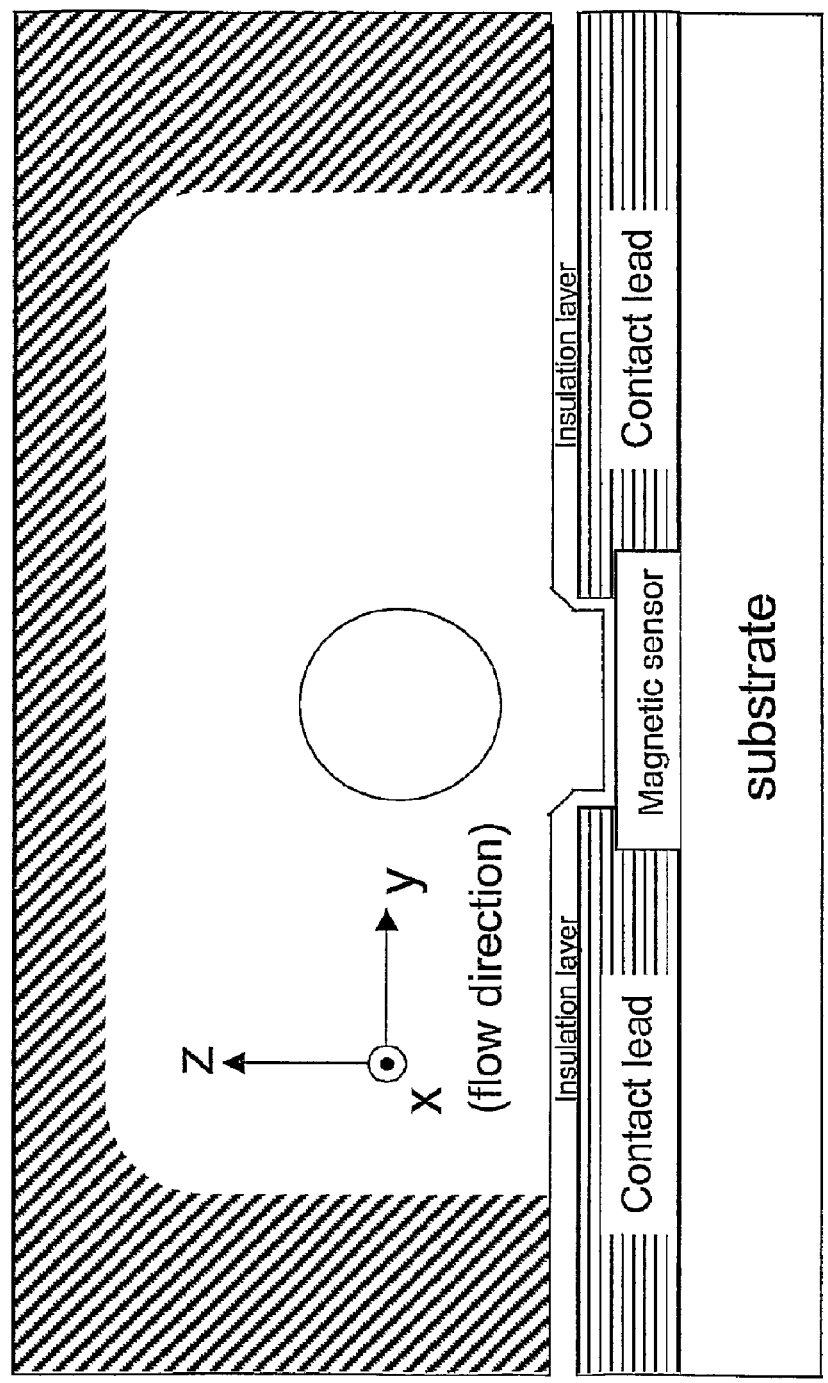

Referring to FIG. 13e, the current-carrying metal stripline 36 generates magnetic field gradient which causes the tags to travel along its edge. The multibit magnetic tag 34 experiences an attractive force towards the edge of the stripline which depends on its magnetic moment. Tags with different magnetic moments are deflected from the central flow by different amounts and are thus sorted into different channel sub-branches. The largest sub-branch 38 embraces the central line of the channel. If no magnetic attraction force is applied, the tags will all flow into this sub-branch. Referring to FIG. 13f, this shows a vertical cross-section through the device showing a multibit magnetic tag 34 in the process fluid.

Applications

The technology described herein can be used to perform a variety of assays where typically, the assay will look for interaction between a functionalised MBM tag and a specific target. The identity of the compound specifically interacted with a target will then be determined by decoding the MBM tag and hence, the identity of the target will be determined. The large diversity of uniquely tagged compounds that can be generated means that a large number of interactions can be followed simultaneously. Specifically, such an assay may involve bringing into contact a library of the functionalised MBM tags described herein, and a sample comprising targets to be detected under conditions which allow the binding of the biological or chemical moieties to their targets, if present; and identifying compounds which have bound to a target and decoding the MBM tag carried by such compounds to identify which, if any, target molecules are present. The assay may involve washing or other steps to remove unbound compounds and then reading the tags of the remaining compounds. In a preferred embodiment it may involve passing all the tags through a fluorescence activated cell sorter (FACS) or any other similar or suitable device that detects and sorts the hybridised tags based on their fluorescence emission or on any other characteristic property.

The target that is to be analysed can include bacteria, viruses, tumour cells, nucleic acid characteristic or non characteristic of a disease, a nucleotide sequence specific for an organism, an antigen specific for a disease or an organism or cell type, which may be an animal, a virus, a bacterium or a plant. The target compounds can also be antibodies that are characteristic of a virus, such as HIV, or one or more specific strains of a virus or one or more genes of a virus, or proteins characteristic of diseases. The technology can be used for determining whether a person is infected by viruses or whether a person expresses one or more proteins of interest, such as viral proteins, bacteria proteins, or other proteins specifically associated with diseases. Furthermore, the technology provides for multiplexed analysis of more than one (e.g., tens, hundreds, thousands, millions and billions) target compounds on one assay.

Until recently, genetic analysis was often limited to the use of a small number of genetic markers and the study of relatively simple genetic diseases. Now, with the completion of the first draft of the sequence of the human genome, researchers are extending their studies, seeking to identify genetic factors that influence complex disorders involving multiple genes (such as cancer, heart disease, diabetes, etc.), develop clinical tests to tailor treatments to individual patients and identify new drug targets. In addition, physicians hope a better understanding of the generic differences associated with drug response will enable them to minimise adverse drug reactions and optimise drug efficacy. To fully realise this potential, however, techniques that enable large scale analyses (high throughput) of the whole genome as well as selected candidate regions are desirable. With the technology proposed here the sequence of DNA molecules from a sample can be rapidly identified and individual genome sequencing may be feasible. The genetic profile of individuals could be determined very fast and personalised treatment prescribed. In addition, large scale genetic studies of entire populations could be undertaken.

In another embodiment the biological moiety in the library may be a nucleic acid probe specific for a single nucleotide polymorphism (SNP). Typically, the library as a whole will comprise probes specific for each of the possible SNPs of a particular genome area. For example the library may comprise SNP specific probes for from 2 to millions of SNPs. Typically, the probes will be ones specific for polymorphisms in the same species of genome and in particular, the probes will be specific for the human genome. In other embodiments, the library may include probes specific for particular known SNPs associated with a particular disease. The library may be used to assess whether an individual possesses or not a particular disease gene. In other cases, the library may be used to genotype a subject for multiple polymorphisms and generate data related to the probability that an individual will suffer from a particular disease.

The generic technology can be applied to assessing various diagnostic targets such as determination of SNPs for disease and forensic applications. A diagnostics device utilising this can be designed as a point of care instrument used in medical practitioner's offices for general screening of the genetic predisposition of a population to diseases, or for determination of the genetic identity or genetic mutations in an organism's genome or for screening of patients for identification of agents of diseases. Specimens of an organism's fluids, such as blood can be screened using the point of care device or an instrument, based on these the technology can be used in the field and be portable, simple to use and with the ability to be modified easily for screening of specific agents.

Further embodiment of the invention can be applied for environmental testing as well as for infectious diseases testing that requires analysis of a large volume of fluids to detect the presence of target compounds. The advantages are that a target sample can be screened for the presence of very large numbers of target compounds/molecules in one reaction (high throughput screening and analysis) without the need for extensive preparation of the sample. In addition, analysing large sample volumes is possible.

The techniques for genotyping and in particular those for genotyping SNPs may be employed in linkage studies and association studies to map genes associated with specific diseases. In a preferred embodiment, they may be used to identify individuals at risk of a particular condition as they carry a mutation causing a disease or which is linked with the disease gene itself. The technologies described herein are also applicable to genotyping a variety of organisms, such as plants or animals. In an especially preferred embodiment, the assays may be used to genotype an individual and provide information about the course of a treatment and/or design drugs tailor-made for the specific individual that eliminate or minimise any possible side effects. There are these useful applications in the field of pharmacogenomics. In another embodiment, assays for the comparison of the genomes of two or more organisms may be carried out based on the generation of vast libraries of functionalised multi-bit magnetically encoded tags. In some cases, genotype and/or sequencing data accumulated using the invention can be compared for pathogenic and non-pathogenic organisms.

Further aspects of the invention are set out in the following clauses:

1. A microscopic Digital Multibit Magnetic (DMM) tag comprising: magnetic microelements or domains that can adopt discrete magnetic configurations to provide binary codes (bits) and a chemical or biological moiety synthesised onto, or attached to, the MBM tag.
2. The magnetic configurations of the bits in a MBM tag form a binary code capable of uniquely identifying the moiety carried with the MBM tag. The bits can be from 2 to 100.
3. Multi-bit magnetically encoded tags able to flow in a pumped liquid stream. Magnetic encoders/decoders to encode/decode each tag flowing in a liquid stream of tags.
4. Each MBM tag has or can adopt one digital code of a plurality of possible configurations (billions of digital codes) and hence uniquely encode each and every moiety of a chemical library that consists of many different moieties (billions). A unique one-to-one correspondence between each and every moiety and a magnetic code is thus implemented.
5. According to clause 4, the MBM tag is made to adopt a different code for each and every step of the synthesis of the moiety. Hence, by encoding during the synthesis of a moiety, the synthesis history of it is recorded onto a single MBM tag and a unique writable and readable code is assigned to each and every moiety synthesised in a specific step of the chemical synthesis.
6. A method, based on the generic technology described in any of the preceding causes, for the detection and identification of many target molecules in a sample solution utilising multi-bit magnetically encoded tags according to the preceding claims having in contact ligands capable of hybridising to the target ligands, flow channels with magnetic encoders and/or decoders, electrodes for the controlled flow of the multi-bit magnetically encoded tags and optical systems necessary for the detection of the hybridised tags.
7. The method of the preceding clauses can also be implemented for the detection of multi-bit magnetically encoded tags where the moieties are proteins or antibodies or antigens or biological cells or peptides or other chemical or biological compounds and/or identify biological or chemical compounds capable of binding to a target.
8. The method can also be implemented for the detection of single nucleotide polymorphisms (SNPs).
9. The flow channels through which a solution (medium) can flow have at least one magnetic encoder/decoder capable of encoding and decoding the multi-bit magnetically encoded tags according to the preceding claims, these channels also having electrodes for manipulating, moving, rotating, focusing, sorting and controlling the flow of the multi-bit magnetically encoded tags via electrophoretic or electromagnetic or hydrodynamic forces.
10. The technology can be utilised to follow multiple biological or chemical reactions or to detect multiple biological or chemical moieties simultaneously.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. Apparatus for writing a code onto a magnetic tag having a plurality of magnetically switchable elements for storing said information, said elements being separately switchable at different strengths of an external applied field, the apparatus comprising:

means for writing a code onto said magnetic tag by applying a set of external applied fields to said tag, each field of said set of applied fields comprising a field of sufficient strength to switch ones of said elements having switching strengths equal to or less than the field strength, said applying comprising applying said fields in turn from a strongest field to a weakest field, whereby after each said field application successive said elements are switched to a magnetic state which is substantially unaffected by subsequently applied fields of the set, wherein each of said plurality of magnetically switchable elements has a different coercivity such that said plurality of magnetically switchable elements are addressable for writing using a ladder of magnetic fields of successive field strengths.

2. Apparatus as claimed in claim 1 further comprising means for separating chemical or biological molecules or moieties or biological entities associated with a plurality of said magnetic tags, wherein said magnetic tags are capable of adopting a plurality of remanent magnetic configurations corresponding to binary information, the means for separating comprising:

at least one input for tagged molecules or moieties or entities associated with said tags;
at least two outputs for tagged molecules or moieties or entities associated with said tags;
at least one reader to read said binary information; and
a switch to direct said molecules or moieties or entities associated with said tags to a selected said output responsive to said binary information.

3. Apparatus as claimed in claim 2 further comprising:
a microfluidic flow channel incorporating:
one or more magnetic readers to read said binary information; and
one or more magnetic writers to write said binary information.

4. Apparatus as claimed in claim 3 further comprising one or both of strip lines and electrodes to control one or both of the position and orientation of the tags via electric or magnetic fields.

5. An apparatus as claimed in claim 2 further comprising a writer to write said read information back to a tag from which the information was read.

6. An apparatus as claimed in claim 2 wherein said switch comprises an electromagnet to deflect a said tagged object.

7. An apparatus as claimed in claim 2 wherein a said reader comprises a sensor to sense the initial configuration of the tag, an electromagnet to apply a magnetic field to said tag and ramped in increasing strength and a sensor to monitor switching of magnetic regions in said tag as said field strength is increased.

8. An apparatus as claimed in claim 2 wherein a said writer comprises an electromagnet to apply a magnetic field to said tag ramped in decreasing strength.

9. An apparatus as claimed in claim 2 including a plurality of channels between said input and said outputs.

10. An apparatus as claimed in claim 2 in a microfluidic chip, said microfluidic chip including a fluid channel from said input past said reader to said outputs, and wherein said channel includes a constriction to limit flow of said tags such that they pass said reader substantially one at a time.

11. An apparatus as claimed in claim 10 wherein said constriction has a maximum lateral dimension of 200 microns.

12. A method of writing a code onto a magnetic tag flowing within a fluidic channel, the method comprising:
providing a tag comprising a set of magnetically switchable elements for storing said code, each said element of said set having a different coercivity such that said of said set elements are addressable for writing using a ladder of magnetic fields of successive field strengths, said elements being separately switchable at different strengths of an external applied field, the method further comprising:
writing a code onto said magnetic tag by
applying a set of external applied fields to said tag, each field of said set of applied fields comprising a field of sufficient strength to switch ones of said elements having switching strengths equal to or less than the field strength, said applying comprising applying said fields in turn from a strongest field to a weakest field, whereby after each said field application successive said elements are switched to a magnetic state which is substantially unaffected by subsequently applied fields of the set.

13. A method as claimed in claim 12 wherein said magnetic elements comprise independent beads in said fluidic channel.

14. A method as claimed in claim 12 wherein said writing comprises globally writing said code onto said tag, and wherein said external applied fields are applied globally to said tag.

15. A method as claimed in claim 12 wherein a said magnetic state of a said element comprises a direction of magnetization of the element.

16. A method as claimed in claim 12 wherein said tag has a maximum dimension of less than 50 micrometers and wherein said fluidic channel is a microfluidic channel.

17. A method of reading a code from a magnetic tag having a set of magnetically switchable elements storing said code, each said element of said set having a different coercivity such that said of said set elements are addressable for writing using a ladder of magnetic fields of successive field strengths, said elements being separately switchable at different strengths of an external applied field, the method comprising:
applying an external applied field to said plurality of switchable regions simultaneously in increasing strength from a strength below a smallest switching strength of a said region to above a greatest switching strength of a said region; and
monitoring switching of said regions as said field is increased by monitoring the net magnetic dipole field of said tag;
wherein said applying of said external applied field comprises applying said field globally to said tag, and making a global differential measurement of a total magnetic moment of said tag to remove a degeneracy of tag codes having the same total magnetic moment.

18. A method as claimed in claim 17 wherein said applying comprises applying said applied field in a sweep including strengths intermediate between said switching strengths of said regions.

19. A method as claimed in claim 17 wherein said monitoring of said switching comprises identifying reversals in directions of magnetisation of said elements.

20. A method as claimed in claim 17 further comprising determining said code from a vector R, where $R = m \cdot (I - 2C)$ where m is a vector of magnetic moments of said tag, I is the Identity vector, and C is a vector defining a sequence of measurements on said tag.

21. Apparatus for reading information from a magnetic tag having a plurality of magnetically switchable regions storing said information, said regions being separately switchable at different strengths of an external applied field, the apparatus comprising:
means for applying an external applied field to said plurality of switchable regions simultaneously in increasing strength from a strength below a smallest switching strength of a said region to above a greatest switching strength of a said region;
means for monitoring switching of said regions as said field is increased by monitoring the magnetic moment of said tag; and
means for making a global differential measurement of a total magnetic moment of said tag to remove a degeneracy of tag codes having the same total magnetic moment; wherein each of said plurality of magnetically switchable elements has a different coercivity such that said plurality of magnetically switchable elements are addressable for writing using a ladder of magnetic fields of successive field strengths.

22. Apparatus as claimed in claim 21 wherein said means for applying said field comprises means for applying said applied field in a set of discrete strengths including strengths intermediate between said switching strengths of said regions.

* * * * *